United States Patent
Tsubokura et al.

(10) Patent No.: US 11,066,957 B2
(45) Date of Patent: Jul. 20, 2021

(54) AXIAL-FLOW FLUID MACHINE AND TIP CLEARANCE MEASURING METHOD THEREFOR

(71) Applicant: Mitsubishi Hitachi Power Systems, Ltd., Kanagawa (JP)

(72) Inventors: Ikko Tsubokura, Yokohama (JP); Hitoshi Morimoto, Yokohama (JP); Koichi Takahashi, Yokohama (JP); Kazuhiro Ikushima, Takasago (JP); Takuya Komukai, Yokohama (JP); Motohiro Iwasaki, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 0 days.

(21) Appl. No.: 16/639,212

(22) PCT Filed: Oct. 16, 2018

(86) PCT No.: PCT/JP2018/038485
§ 371 (c)(1),
(2) Date: Feb. 14, 2020

(87) PCT Pub. No.: WO2019/082737
PCT Pub. Date: May 2, 2019

(65) Prior Publication Data
US 2020/0256214 A1 Aug. 13, 2020

(30) Foreign Application Priority Data
Oct. 23, 2017 (JP) .............................. JP2017-204670

(51) Int. Cl.
*F01D 25/24* (2006.01)
*F01D 11/22* (2006.01)
(Continued)

(52) U.S. Cl.
CPC ................ *F01D 25/24* (2013.01); *F02C 7/00* (2013.01); *F01D 11/22* (2013.01); *F01D 25/28* (2013.01);
(Continued)

(58) Field of Classification Search
CPC ........ F01D 11/22; F01D 21/003; F01D 25/24; F01D 25/28; F01D 25/285; F04D 19/02;
(Continued)

(56) References Cited

U.S. PATENT DOCUMENTS 6,772,581 B2 * 8/2004 Ojiro ....................... F01D 11/24
  415/114
8,313,283 B2 * 11/2012 Morimoto ............... F01D 25/00
  415/118
(Continued)

FOREIGN PATENT DOCUMENTS

| JP | 10-77803 | 3/1998 |
| JP | 2004-162536 | 6/2004 |
| JP | 2007-77868 | 3/2007 |

OTHER PUBLICATIONS

International Search Report dated Jan. 8, 2019 in International (PCT) Application No. PCT/JP2018/038485 with English-language translation.
(Continued)

*Primary Examiner* — Igor Kershteyn
(74) *Attorney, Agent, or Firm* — Wenderoth, Lind & Ponack, L.L.P.

(57) ABSTRACT

An axial-flow fluid machine provided with: a retainer ring holding a stationary blade train; a casing supporting the retainer ring; and an eccentric pin. An engagement part of the casing has a protruding section protruding to the retainer ring side. An engagement part of the retainer ring has a pair of wall plate sections forming a groove into which the
(Continued)

protruding section is put. In the casing, a penetration hole is formed extending in a radial direction so as to be centered about a penetration center position that is biased to an axial upstream side in a region of the casing where the engagement part is formed. In the engagement part of the casing, a portion on an axial downstream side relative to the penetration hole exists in the entire circumferential area. The eccentric pin is inserted into the penetration hole.

17 Claims, 18 Drawing Sheets

(51) Int. Cl.
  *F04D 29/64* (2006.01)
  *F02C 7/00* (2006.01)
  *F01D 25/28* (2006.01)
(52) U.S. Cl.
  CPC ........ *F04D 29/644* (2013.01); *F05D 2230/64* (2013.01); *F05D 2260/30* (2013.01)

(58) Field of Classification Search
  CPC .......... F04D 29/64; F04D 29/644; F02C 7/00; G01M 15/14; F05D 2230/64; F05D 2230/644; F05D 2260/30; F05D 2260/83
  See application file for complete search history.

(56) References Cited

U.S. PATENT DOCUMENTS

| | | | |
|---|---|---|---|
| 10,962,344 | B2 * | 3/2021 | Nishioka ................ G01B 21/16 |
| 2009/0180865 | A1 | 7/2009 | Morimoto |

OTHER PUBLICATIONS

Written Opinion of the International Searching Authority dated Jan. 8, 2019 in International (PCT) Application No. PCT/JP2018/038485 with English-language translation.

* cited by examiner

AXIAL-FLOW FLUID MACHINE AND TIP CLEARANCE MEASURING METHOD THEREFOR

TECHNICAL FIELD

The present invention relates to an axial-flow fluid machine and a tip clearance measuring method therefor.

Priority is claimed on Japanese Patent Application No. 2017-204670, filed on Oct. 23, 2017, the content of which is incorporated herein by reference.

BACKGROUND ART

An axial-flow fluid machine includes the rotor that rotates around an axis, a retainer ring having a cylindrical shape formed around the axis and disposed on an outer peripheral side of the rotor, a plurality of stator blade rows disposed on an inner peripheral side of the retainer ring and held by the retainer ring, and a casing having a cylindrical shape formed around the axis and disposed on an outer peripheral side of the retainer ring. The plurality of stator blade rows are disposed at an interval in an axial direction. The stator blade row is configured to include a plurality of stator blades aligned in a circumferential direction with respect to the axis. The rotor has a rotor shaft and a plurality of rotor blade rows attached to the rotor shaft. Each of the rotor blade rows is disposed on an axially upstream side or an axially downstream side of any one stator blade row out of the plurality of stator blade rows. The rotor blade row is configured to include a plurality of rotor blades aligned in the circumferential direction.

Performance of the axial-flow fluid machine configured in this way depends on an interval between a radially outer side end of the rotor blade and a stationary member disposed on the radially outer side of the rotor blade, that is, a size of a tip clearance. Therefore, the tip clearance is measured during a manufacturing process of the axial-flow fluid machine.

For example, as a tip clearance measuring method for the axial-flow fluid machine, a method disclosed in PTL 1 below is known. According to this method, a cylindrical guide frame that penetrates a casing and a retainer ring in a radial direction is disposed in the radial direction, and a measuring rod is inserted into the cylindrical guide frame. Then, according to this method, the tip clearance is obtained based on a movement amount of the measuring rod at that time by bringing a tip of the measuring rod into contact with the radially outer side end of the rotor blade.

CITATION LIST

Patent Literature

[PTL 1] Japanese Unexamined Patent Application Publication No. 2007-077868

SUMMARY OF INVENTION

Technical Problem

Tip clearance measurement to be performed during an assembly process is performed in order to confirm whether or not the performance of the axial-flow fluid machine satisfies target performance during an operation of the axial-flow fluid machine. Therefore, even during the assembly process, it is preferable to measure the tip clearance in a state close to an operating state.

Therefore, the present invention aims to provide the axial-flow fluid machine capable of measuring the tip clearance in a state close to an operating state even during the assembly process, and a tip clearance measuring method therefor.

Solution to Problem

According to a first aspect of the invention, in order to achieve the above-described object, there is provided an axial-flow fluid machine. The axial-flow fluid machine includes a rotor having a plurality of rotor blades disposed at an interval in a circumferential direction with respect to a rotor axis, and rotating around the rotor axis, a stator blade row having a plurality of stator blades disposed at an interval in the circumferential direction at a position shifted from the plurality of rotor blades in an axial direction in which the rotor axis extends, a cylindrical retainer ring that holds the stator blade row from a radially outer side with respect to the rotor axis, and a cylindrical casing that supports the retainer ring from the radially outer side. The retainer ring and the casing have engaging portions which engage with each other. The engaging portion of one member out of the retainer ring and the casing has a projecting portion projecting to the other member side in a radial direction with respect to the rotor axis and extending in the circumferential direction. The engaging portion of the other member has a pair of wall plate portions projecting to the one member side in the radial direction, extending in the circumferential direction, facing each other in the axial direction, and forming a groove therebetween so that the projecting portion enters the groove. In the casing, a through-hole penetrating in the radial direction around a penetration center position biased to one side in the axial direction is formed inside a region where the engaging portion is formed in the casing in the axial direction. In the engaging portion of the casing, the other side portion in the axial direction with reference to the through-hole is present in an entire area in the circumferential direction. In a portion at the penetration center position in the circumferential direction on the one side in the axial direction with reference to the penetration center position, the engaging portion of the casing is cut out due to the through-hole.

During an actuating process of the axial-flow fluid machine, a difference occurs between thermal elongation of the casing and thermal elongation of the retainer ring. In order to absorb a thermal elongation difference, even in a state where the projecting portion of one member out of the retainer ring and the casing enters the groove of the other member, a clearance is present between the projecting portion and a surface forming the groove. Therefore, even in a state where the projecting portion enters the groove, the groove of the other member is slightly and relatively movable with respect to the projecting portion of one member. That is, even in a state where the casing and the retainer ring engage with each other, the retainer ring slightly and relatively movable with respect to the casing.

In the axial-flow fluid machine, one side out of the axially upstream side and the axially downstream side is the high-pressure side where the pressure of the fluid flowing in the axial-flow fluid machine increases, and the other side is the low-pressure side where the pressure of the fluid is relatively low. Accordingly, in the axial-flow fluid machine in an operating state, a force oriented toward the low-pressure side is applied to the stator blade. Incidentally, as described above, even in a state where the casing and the retainer ring engage with each other, the retainer ring is slightly and relatively movable with respect to the casing. Therefore, the retainer ring that holds the stator blade slightly and relatively moves to the low-pressure side with respect to the casing due to the force oriented toward the low-pressure side, which is applied to the stator blade.

An inner peripheral surface of a stationary member present on the radially outer side of the rotor blade forms a gas pass surface. A clearance in the radial direction between the radially outer side end of the rotor blade and the gas pass surface is a tip clearance. An inner diameter of an inner peripheral surface of the stationary member, which is one measurement base point in measuring the tip clearance, varies depending on positions in the axial direction. The stationary member is the retainer ring or a member supported by the retainer ring. Therefore, if a relative position of the stationary member in the axial direction with respect to the casing varies when the tip clearance is measured and when the axial-flow fluid machine is operated, the tip clearance cannot be measured the axial-flow fluid machine in the operating state.

In the axial-flow fluid machine according to this aspect, before the tip clearance is measured, the pin according to a fifth aspect or a sixth aspect (to be described later) is inserted into the through-hole of the casing, and the pin is relatively displaced with respect to an inner peripheral surface of the through-hole. The retainer ring is pushed to the low-pressure side by the pin. As a result, a relative positional relationship between the casing and the retainer ring in the axial direction becomes the same as that of the axial-flow fluid machine in the operating state by causing the pin to push the retainer ring to the low-pressure side.

In this aspect, the tip clearance (to be described later) is measured while maintaining a state where the retainer ring is pushed to the low-pressure side by the pin. Accordingly, in this aspect, the tip clearance can be measured in a state close to the operating state.

Within a space between the retainer ring and the casing in the radial direction, the fluid flows into a space on the high-pressure side with reference to the retainer ring and the engaging portion of the casing. In this aspect, in the portion at the penetration center position in the circumferential direction on one side in the axial direction with reference to the penetration center position, the engaging portion of the casing is cut out due to the through-hole. However, in this aspect, in the engaging portion of the casing, the other side portion in the axial direction with reference to the through-hole is present in the entire area in the circumferential direction. Therefore, it is possible to prevent the fluid flowing into the space on the high-pressure side with reference to the engaging portion from flowing out to the space on the low-pressure side with reference to the engaging portion.

In order to achieve the above-described object, in the axial-flow fluid machine according to a second aspect of the invention, in the axial-flow fluid machine according to the first aspect, the engaging portion of the casing has the projecting portion, and the engaging portion of the retainer ring has the pair of wall plate portions. In the axial-flow fluid machine according to the first aspect, the engaging portion of the casing has the projecting portion, and the engaging portion of the retainer ring has the pair of wall plate portions. Out of sides facing each other in the axial direction, a high-pressure side serving as a side on which a fluid flowing in the axial direction has higher pressure due to rotation of the rotor is the other side, and a low-pressure side opposite to the high-pressure side is the one side. The penetration center position is a position biased to the low-pressure side in the axial direction inside the region where the engaging portion is formed in the casing in the axial direction. In the projecting portion of the casing, a portion on the high-pressure side in the axial direction with reference to the through-hole is present in the entire area in the circumferential direction.

In order to achieve the above-described object, in the axial-flow fluid machine according to a third aspect of the invention, in the axial-flow fluid machine according to the first aspect, the engaging portion of the casing has the pair of wall plate portions. The engaging portion of the retainer ring has the projecting portion. Out of sides facing each other in the axial direction, a high-pressure side serving as a side on which a fluid flowing in the axial direction has higher pressure due to rotation of the rotor is the one side, and a low-pressure side opposite to the high-pressure side is the other side. The penetration center position is a position biased to the high-pressure side in the axial direction inside the region where the engaging portion is formed in the casing in the axial direction, and out of the pair of wall plate portions of the casing, the wall plate portion on the low-pressure side in the axial direction with reference to the through-hole is present in the entire area in the circumferential direction.

In order to achieve the above-described object, in the axial-flow fluid machine according to a fourth aspect of the invention, in the axial-flow fluid machine according to any one of the first aspect to the third aspect, the casing has a plurality of the through-holes formed at an interval in the circumferential direction.

In order to achieve the above-described object, in the axial-flow fluid machine according to a fifth aspect of the invention, the axial-flow fluid machine according to any one of the first aspect to the fourth aspect further includes a pin that is inserted into the through-hole. The through-hole is a columnar hole formed around the penetration center position. The pin has a columnar pin main body capable of being inserted into the through-hole and having an outer peripheral surface coming into contact with an inner peripheral surface of the through-hole, and an eccentric portion formed in an end of the pin main body in a pin extending direction in which a pin central axis of the pin main body extends. The eccentric portion has a columnar shape formed around an eccentric axis parallel to the pin central axis and separated from the pin central axis, and an outer diameter of the eccentric portion is smaller than an outer diameter of the pin main body.

In this aspect, the pin is inserted into the through-hole, and the pin is rotated around the pin central axis. In this manner, the retainer ring can be pushed to the low-pressure side by the eccentric portion of the pin.

In order to achieve the above-described object, in the axial-flow fluid machine according to a sixth aspect of the invention, the axial-flow fluid machine according to any one of the first aspect to the fourth aspect further includes a pin that is inserted into the through-hole. The pin has a tapered surface inclined with respect to a pin extending direction in which the pin extends, which is formed in an end portion of the pin in the pin extending direction.

In this aspect, the pin is pushed into the through-hole by directing the tapered surface of the pin toward the low-pressure side. In this manner, the retainer ring can be pushed to the low-pressure side by the tapered surface of the pin.

In order to achieve the above-described object, in the axial-flow fluid machine according to a seventh aspect of the invention, the axial-flow fluid machine according to the sixth aspect further includes a lid that closes the through-hole from the radially outer side.

In order to achieve the above-described object, in the axial-flow fluid machine according to an eighth aspect of the invention, in the axial-flow fluid machine according to the seventh aspect, a length of the pin in the pin extending direction is a length that causes the pin to interfere with the lid when the pin is pushed into the through-hole and the lid closes the through-hole.

In this aspect, in a case where the pin remains in the through-hole, the through-hole cannot be closed by the lid. Therefore, when the through-hole is closed by the lid, in a case where the pin remains in the through-hole, a worker becomes aware of the presence of the pin. Therefore, in this aspect, the worker can be prevented from forgetting to remove the pin.

In order to achieve the above-described object, in the axial-flow fluid machine according to a ninth aspect of the invention, in the axial-flow fluid machine according to any one of the first aspect to the eighth aspect, the casing is a compressor casing into which gas flows from an axially upstream side which is a first side in the axial direction, and which discharges the gas from an axially downstream side opposite to the axially upstream side. The rotor is a compressor rotor that rotates around the rotor axis so as to compress the gas as the gas flows toward the axially downstream side.

In order to achieve the above-described object, in the axial-flow fluid machine according to a tenth aspect of the invention, in the axial-flow fluid machine according to any one of the first aspect to the eighth aspect, the casing is a turbine casing into which gas flows from an axially upstream side which is a first side in the axial direction, and which exhausts the gas from an axially downstream side opposite to the axially upstream side. The rotor is a turbine rotor to which a rotational force is applied by the gas flowing inside the turbine casing from the axially upstream side to the axially downstream side.

According to an eleventh aspect of the invention, in order to achieve the above-described object, a tip clearance measuring method is applied to the following axial-flow fluid machine.

The axial-flow fluid machine includes a rotor having a plurality of rotor blades disposed at an interval in a circumferential direction with respect to a rotor axis, and rotating around the rotor axis, a stator blade row having a plurality of stator blades disposed at an interval in the circumferential direction at a position shifted from the plurality of rotor blades in an axial direction in which the rotor axis extends, a cylindrical retainer ring that holds the stator blade row from a radially outer side with respect to the rotor axis, and a cylindrical casing that supports the retainer ring from the radially outer side. The retainer ring and the casing have engaging portions which engage with each other. The engaging portion of one member out of the retainer ring and the casing has a projecting portion projecting to the other member side in a radial direction with respect to the rotor axis and extending in the circumferential direction. The engaging portion of the other member has a pair of wall plate portions projecting to the one member side in the radial direction, extending in the circumferential direction, facing each other in the axial direction, and forming a groove therebetween so that the projecting portion enters the groove.

The tip clearance measuring method includes an operating state reproducing step of pushing the retainer ring from a plurality of push positions different from each other in the circumferential direction, to a low-pressure side opposite to a high-pressure side on which a fluid flowing in the axial direction has higher pressure due to rotation of the rotor, out of sides facing each other in the axial direction, and a measuring step of measuring the tip clearance between the rotor blade and the stationary member present on the radially outer side of the rotor blade while the operating state reproducing step is performed.

In order to achieve the above-described object, in the tip clearance measuring method according to a twelfth aspect of the invention, in the tip clearance measuring method according to the eleventh aspect, the casing has a through-hole penetrating in the radial direction. The axial-flow fluid machine includes a pin that is inserted into the through-hole. The operating state reproducing step includes a pin operating step of causing the pin to push the retainer ring to the low-pressure side at one push position out of the plurality of push positions by inserting the pin into the through-hole of the casing and relatively displacing the pin with respect to an inner peripheral surface of the through-hole.

In order to achieve the above-described object, in the tip clearance measuring method according to a thirteenth aspect of the invention, in the tip clearance measuring method for the axial-flow fluid machine according to any one of the first aspect to the fourth aspect, the axial-flow fluid machine includes a pin that is inserted into the through-hole. The tip clearance measuring method includes an operating state reproducing step of pushing the retainer ring from a plurality of push positions different from each other in the circumferential direction, to a low-pressure side opposite to a high-pressure side on which a fluid flowing in the axial direction has higher pressure due to rotation of the rotor, out of sides facing each other in the axial direction, and a measuring step of measuring a tip clearance between the rotor blade and the stationary member present on a radially outer side of the rotor blade while the operating state reproducing step is performed. The operating state reproducing step includes a pin operating step of causing the pin to push the retainer ring to the low-pressure side at one push position out of the plurality of push positions by inserting the pin into the through-hole of the casing and relatively displacing the pin with respect to an inner peripheral surface of the through-hole.

In order to achieve the above-described object, in the tip clearance measuring method according to a fourteenth aspect of the invention, in the tip clearance measuring method according to the twelfth aspect or the thirteenth aspect, the casing has the same number of the through-holes as the number of the plurality of push positions, which are formed at an interval in the circumferential direction. The axial-flow fluid machine has the same number of the pins as the number of the plurality of push positions. In the operating state reproducing step, the pin operating step is performed by using the pins at each push position of all of the push positions.

In order to achieve the above-described object, in the tip clearance measuring method according to a fifteenth aspect of the invention, in the tip clearance measuring method according to any one of the twelfth aspect to the fourteenth aspect, the pin has a columnar pin main body capable of being inserted into the through-hole and having an outer peripheral surface coming into contact with an inner peripheral surface of the through-hole, and an eccentric portion formed in an end of the pin main body in a pin extending direction in which a pin central axis of the pin main body extends. The eccentric portion has a columnar shape formed around an eccentric axis parallel to the pin central axis and separated from the pin central axis, and an outer diameter of the eccentric portion is smaller than an outer diameter of the pin main body. In the pin operating step, the pin is inserted into the through-hole by directing the eccentric portion of the pin toward a radially inner side with respect to the rotor axis, and the pin is rotated around the pin central axis inside the through-hole.

In order to achieve the above-described object, in the tip clearance measuring method according to a sixteenth aspect of the invention, in the tip clearance measuring method according to any one of the twelfth aspect to the fourteenth aspect, the pin has a tapered surface inclined with respect to a pin extending direction in which the pin extends, which is formed in an end portion of the pin in the pin extending direction. In the pin operating step, the pin is pushed into the through-hole by directing an end portion on a side having the tapered surface of the pin toward a radially inner side with respect to the rotor axis, and directing the tapered surface toward the low-pressure side.

In order to achieve the above-described object, in the tip clearance measuring method according to a seventeenth aspect of the invention, in the tip clearance measuring method according to any one of the twelfth aspect to the sixteenth aspect, the retainer ring has a high-pressure side end surface facing the high-pressure side, and a low-pressure side end surface facing the low-pressure side. The operating state reproducing step includes a jack operating step of bringing an operating end of a jack into contact with the push position excluding the push position pushed in the pin operating step out of the plurality of push positions in the circumferential direction on the high-pressure side end surface and causing the jack to push the retainer ring to the low-pressure side by operating the jack.

Advantageous Effects of Invention

According to an aspect of the present invention, a tip clearance can be measured in a state close to an operating state.

BRIEF DESCRIPTION OF DRAWINGS

FIG. 5(A) is a sectional view illustrating a main part of the operating state reproducing structure.

FIG. 5(B) is a sectional view taken along line B-B in FIG. 5(A).

FIG. 6(A) is a sectional view illustrating a main part of the operating state reproducing structure.

FIG. 6(B) is a sectional view taken along line B-B in FIG. 6(A).

FIG. 11(A) is a sectional view illustrating a main part of the operating state reproducing structure.

FIG. 11(B) is a sectional view taken along line B-B in FIG. 11(A).

FIG. 12(A) is a sectional view illustrating a main part of the operating state reproducing structure.

FIG. 12(B) is a sectional view taken along line B-B in FIG. 12(A).

FIG. 13(A) is a sectional view illustrating a main part of the operating state reproducing structure.

FIG. 13(B) is a sectional view taken along line B-B in FIG. 13(A).

FIG. 14(A) is a sectional view illustrating a main part of the operating state reproducing structure.

FIG. 14(B) is a sectional view taken along line B-B in FIG. 14(A).

FIG. 15(A) is a sectional view illustrating a main part of the operating state reproducing structure.

FIG. 15(B) is a sectional view taken along line B-B in FIG. 15(A).

FIG. 16(A) is a sectional view illustrating a main part of the operating state reproducing structure.

FIG. 16(B) is a sectional view taken along line B-B in FIG. 16(A).

FIG. 17(A) is a sectional view illustrating a main part of the operating state reproducing structure.

FIG. 17(B) is a sectional view taken along line B-B in FIG. 17(A).

DESCRIPTION OF EMBODIMENTS

Hereinafter, embodiments and modification examples thereof will be described in detail with reference to the drawings.

First Embodiment

A first embodiment of an axial-flow fluid machine will be described with reference to FIGS. 1 to 10.

Figure 1:
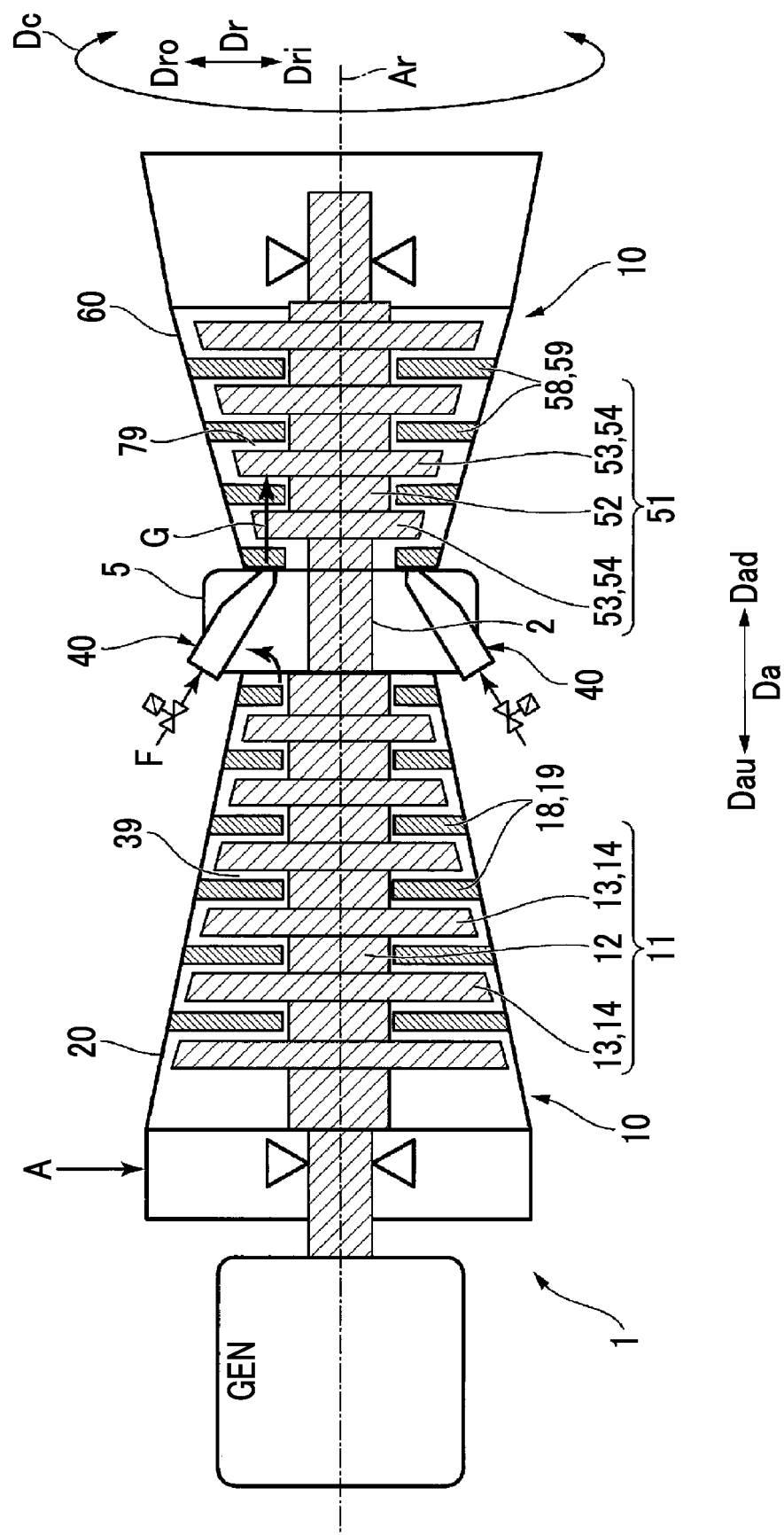
FIG. 1 is a schematic sectional view of a gas turbine according to a first embodiment of the present invention.

The axial-flow fluid machine according to the present embodiment is a compressor 10 of a gas turbine 1. As illustrated in FIG. 1, the gas turbine 1 includes the compressor 10 that compresses air A, a combustor 40 that generates combustion gas G by combusting a fuel F in the air compressed by the compressor 10, and a turbine 50 driven by the combustion gas G.

The compressor 10 includes a compressor rotor 11 that rotates around a rotor axis Ar, a compressor casing 20 that covers the compressor rotor 11, and a plurality of stator blade rows 18. The turbine 50 includes a turbine rotor 51 that rotates around the rotor axis Ar, a turbine casing 60 that covers the turbine rotor 51, and a plurality of stator blade rows 58.

The compressor rotor 11 and the turbine rotor 51 are located on the same rotor axis Ar, and are connected to each other, thereby forming a gas turbine rotor 2. For example, a rotor of a generator GEN is connected to the gas turbine rotor 2. In addition, the compressor casing 20 and the turbine casing 60 are connected to each other, thereby forming a gas turbine casing 5. In the following description, a direction in which the rotor axis Ar extends will be referred to as an axial direction Da, a circumferential direction around the rotor axis Ar will be simply referred to as a circumferential direction Dc, and a direction perpendicular to the rotor axis Ar will be referred to as a radial direction Dr. In addition, the compressor 10 side with reference to the turbine 50 in the axial direction Da will be referred to as an axially upstream side Dau, and a side opposite thereto will be referred to as an axially downstream side Dad. In addition, a side closer to the rotor axis Ar in the radial direction Dr will be referred to as a radially inner side Dri, and a side opposite thereto will be referred to as a radially outer side Dro.

The compressor rotor 11 has the rotor shaft 12 extending in the axial direction Da around the rotor axis Ar, and a plurality of rotor blade rows 13 attached to the rotor shaft 12. The plurality of rotor blade rows 13 are aligned in the axial direction Da. The respective rotor blade rows 13 are all configured to include a plurality of rotor blades 14 aligned in the circumferential direction Dc. A stator blade row 18 is disposed on each axially downstream side Dad of the plurality of rotor blade rows 13. The respective stator blade rows 18 are disposed inside the compressor casing 20. The respective stator blade rows 18 are all configured to include a plurality of stator blades 19 aligned in the circumferential direction Dc. Accordingly, the compressor 10 is the axial-flow fluid machine.

The turbine rotor 51 has a rotor shaft 52 extending in the axial direction Da around the rotor axis Ar, and a plurality of rotor blade rows 53 attached to the rotor shaft 52. The plurality of rotor blade rows 53 are aligned in the axial direction Da. The respective rotor blade rows 53 are all configured to include a plurality of rotor blades 54 aligned in the circumferential direction Dc. A stator blade row 58 is disposed on each axially upstream side Dau of the plurality of rotor blade rows 53. The respective stator blade rows 58 are disposed inside the turbine casing 60. The respective stator blade rows 58 are all configured to include a plurality of stator blades 59 aligned in the circumferential direction Dc. Accordingly, the turbine 50 is the axial-flow fluid machine.

As described above, the compressor 10 and the turbine 50 which configure the gas turbine 1 are the axial-flow fluid machines. Accordingly, the gas turbine 1 is also the axial-flow fluid machine.

Figure 2:
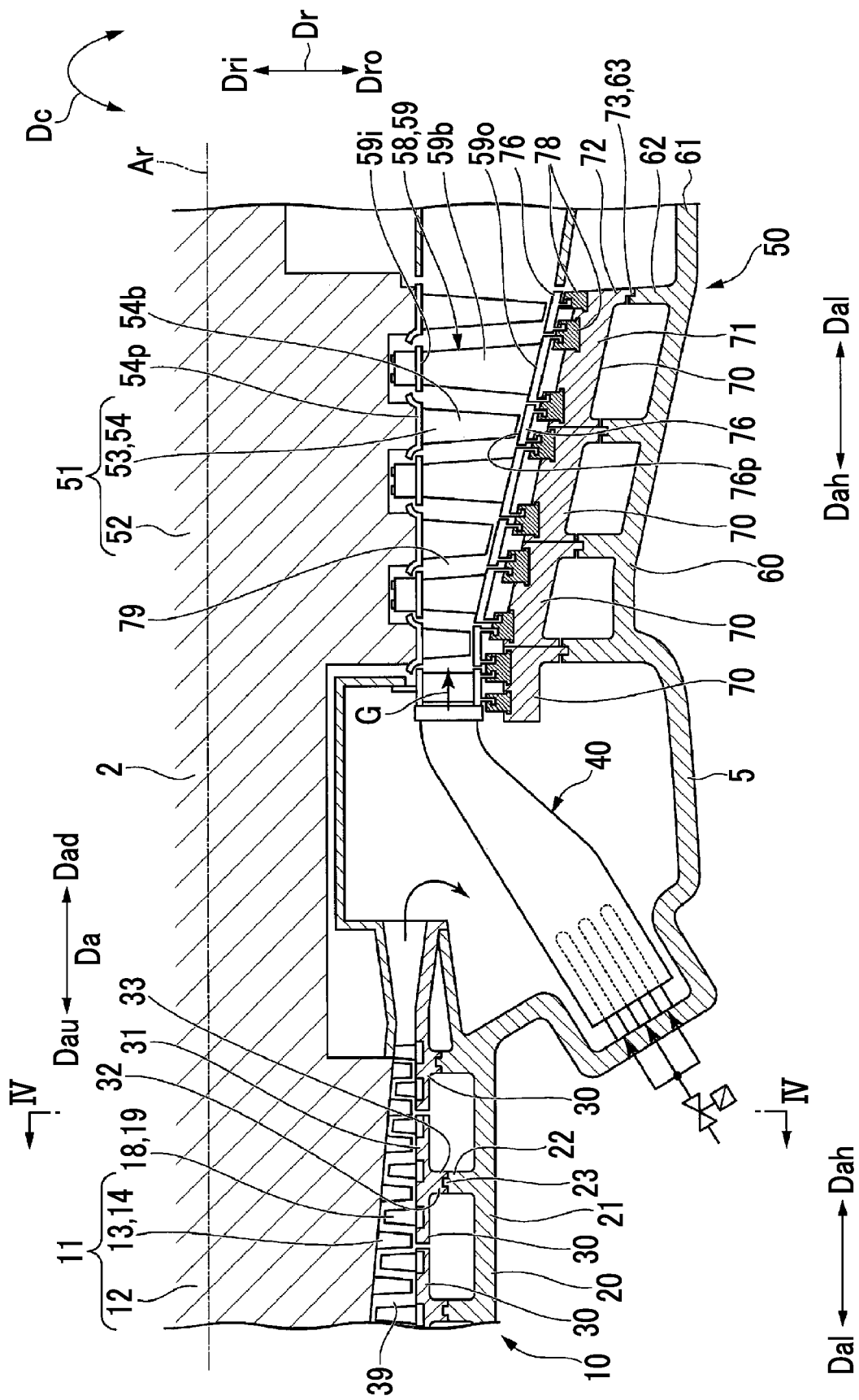
FIG. 2 is a sectional view illustrating a main part of the gas turbine according to the first embodiment of the present invention.

As illustrated in FIG. 2, the compressor 10 further includes a plurality of retainer rings 30 that hold the stator blade 19. The plurality of retainer rings 30 are aligned in the axial direction Da. The retainer ring 30 has a ring main body 31 having a cylindrical shape formed around the rotor axis Ar, and a ring leg portion 32 projecting from the ring main body 31 to the radially outer side Dro. The ring leg portion 32 extends in the circumferential direction Dc. The compressor casing 20 has a casing main body 21 having a cylindrical shape formed around the rotor axis Ar, and a plurality of casing leg portions 22 projecting from the casing main body 21 to the radially inner side Dri. The retainer ring 30 is supported by the compressor casing 20 by the ring leg portion 32 engaging with the casing leg portion 22. One or more stator blade rows 18 are fixed to a portion on the radially inner side Dri of the retainer ring 30. A cylindrical space between the radially inner side Dri of the retainer ring 30 and the radially outer side Dro of the rotor shaft 12 forms an air compression flow path 39. The plurality of rotor blades 14 and the plurality of stator blades 19 are disposed in the air compression flow path 39.

The air flowing into the compressor casing 20 is gradually compressed as the air flows to the axially downstream side Dad through the air compression flow path 39, and has high pressure. Accordingly, in the compressor 10 serving as one of the axial-flow fluid machines, the axially downstream side Dad is a high-pressure side Dah, and the axially upstream side Dau is a low-pressure side Dal.

Figure 3:
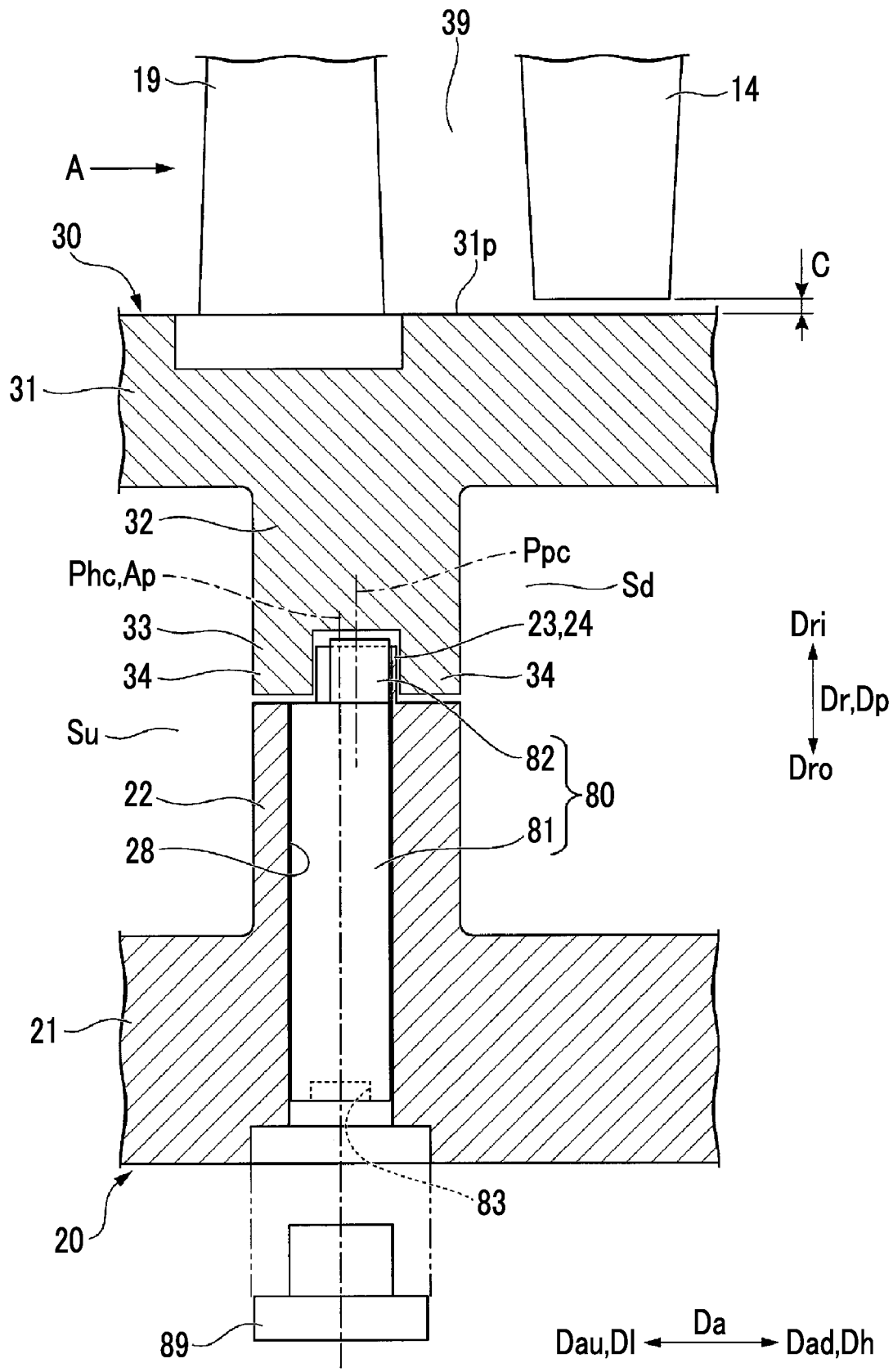
FIG. 3 is a sectional view illustrating a main part of a compressor casing and a retainer ring according to the first embodiment of the present invention.

As illustrated in FIG. 3, the retainer ring 30 and the compressor casing 20 respectively have engaging portions 23 and 33 which engage with each other. The engaging portion 23 of the compressor casing 20 has a projecting portion 24 projecting from the casing leg portion 22 to the radially inner side Dri. The projecting portion 24 extends in the circumferential direction Dc. In addition, the engaging portion 33 of the retainer ring 30 has a pair of wall plate portions 34 projecting from the ring leg portion 32 to the radially outer side Dro and facing each other in the axial direction Da. The pair of wall plate portion 34 extends in the circumferential direction Dc. A groove 35 which the projecting portion 24 of the compressor casing 20 enters is formed between the pair of the wall plate portions 34. The groove 35 is recessed toward the radially inner side Dri, and extends in the circumferential direction Dc. The projecting portion 24 of the compressor casing 20 enters the groove 35 of the retainer ring 30 so that retainer ring 30 engages with the compressor casing 20. However, even in a state where the projecting portion 24 enters the groove 35, there is a slight clearance between the projecting portion 24 and a surface forming the groove 35 in the axial direction Da and the radial direction Dr. The retainer ring 30 and the compressor casing 20 have a thermal elongation difference in the axial direction Da and the radial direction Dr during an actuating process of the compressor 10. The clearance between the projecting portion 24 and the surface forming the groove 35 is present in order to absorb the thermal elongation difference. In this way, even in a state where the projecting portion 24 enters the groove 35, there is the clearance between the projecting portion 24 and the surface forming the groove 35. Accordingly, a recessed portion of the retainer ring 30 is slightly and relatively movable with respect to the projecting portion 24 of the compressor casing 20. That is, even in a state where the compressor casing 20 and the retainer ring 30 engage with each other, the retainer ring 30 is slightly and relatively movable with respect to the compressor casing 20 in the axial direction Da and the radial direction Dr.

An inner peripheral surface of the cylindrical ring main body 31 forms a gas pass surface 31$p$. The gas pass surface 31$p$ defines an edge of the radially outer side Dro of the air compression flow path 39. The gas pass surface 31$p$ partially faces the rotor blade 14 in the radial direction. The clearance in the radial direction between an end of the radially outer side Dro of the rotor blade 14 and the gas pass surface 31$p$ is a tip clearance C. If the tip clearance C is small, during the actuating process of the compressor 10, the rotor blade 14 comes into contact with the retainer ring 30, due to the thermal elongation difference in the radial direction Dr between the compressor rotor 11 and the retainer ring 30. On the other hand, if the tip clearance C is large, the amount of the air leaking from the tip clearance C increases. Therefore, if the tip clearance C is large, performance of the compressor 10 decreases. Accordingly, the performance of the compressor 10 depends on a size of the tip clearance C. Therefore, the tip clearance C is measured in a manufacturing process of the compressor 10.

As illustrated in FIG. 2, the turbine 50 includes a plurality of retainer rings (sometimes, referred to as blade rings) 70, a plurality of heat insulating rings 78, and a plurality of split rings 76. The plurality of retainer rings 70 are aligned in the axial direction Da. The retainer ring 70 has a ring main body 71 having a cylindrical shape formed around the rotor axis Ar, and a ring leg portion 72 projecting from the ring main body 71 to the radially outer side Dro. The ring leg portion 72 extends in the circumferential direction Dc. The turbine casing 60 has a casing main body 61 having a cylindrical shape formed around the rotor axis Ar, and a plurality of casing leg portions 62 projecting from the casing main body 61 to the radially inner side Dri. The retainer ring 70 is supported by the turbine casing 60 by the ring leg portion 72 engaging with the casing leg portion 62.

The stator blade 59 has a blade body 59$b$ having a blade profile and extending in the radial direction Dr, an outer shroud 59$o$ disposed on the radially outer side Dro of the blade body 59$b$, and an inner shroud 59$i$ disposed on the radially inner side Dri of the blade body 59$b$. The rotor blade 54 has a blade body 54$b$ having a blade profile and extending in the radial direction Dr, and a platform 54$p$ having the radially inner side Dri of the blade body 54$b$. In the rotor blade 54, a portion on the radially inner side Dri of the platform 54$p$ is fixed to the rotor shaft 52. The platform 54$p$ is adjacent to the inner shroud 59$i$ of the stator blade 59 in the axial direction Da. The split ring 76 is disposed between the outer shrouds 59$o$ of the stator blades 59 adjacent to each other in the axial direction Da. Therefore, the split ring 76 faces the rotor blade 54 in the radial direction Dr.

The heat insulating ring 78 connects the split ring 76 and the retainer ring 70 to each other. The heat insulating ring 78 further connects the outer shroud 59$o$ of the stator blade 59 and the retainer ring 70 to each other. Accordingly, the stator blade 59 is held by the retainer ring 70 via the heat insulating ring 78.

A cylindrical space between the inner shroud 59$i$ and the outer shroud 59$o$ of the stator blade 59 and between the platform 54$p$ and the split ring 76 of the rotor blade 54 forms a combustion gas flow path 79. The combustion gas G flows into the combustion gas flow path 79 from the combustor 40. The combustion gas G flows to the axially downstream side Dad through the combustion gas flow path 79. The combustion gas G applies a rotational force to the turbine rotor 51 during a process of flowing through the combustion gas flow path 79. Therefore, as the combustion gas G flows to the axially downstream side Dad through the combustion gas flow path 79, the pressure gradually decreases. Accordingly, unlike the above-described compressor 10, in the turbine 50 serving as one of the axial-flow fluid machines, the axially downstream side Dad is the low-pressure side Dal, and the axially upstream side Dau is the high-pressure side Dah.

In the split ring 76, a surface facing the radially inner side Dri forms a gas pass surface 76$p$. The gas pass surface 76$p$ defines an edge of the radially outer side Dro of the combustion gas flow path 79. A portion of the gas pass surface 76$p$ faces the rotor blade 54 and the radial direction Dr. The clearance in the radial direction Dr between an end of the radially outer side Dro of the rotor blade 54 and the gas pass surface 76$p$ is the tip clearance. If the tip clearance is small, during the actuating process of the turbine 50, the rotor blade 54 comes into contact with the split ring 76, due to the thermal elongation difference in the radial direction Dr between the turbine rotor 51 and the retainer ring 70. On the other hand, if the tip clearance is large, the amount of the combustion gas G leaking from the tip clearance increases. Therefore, if the tip clearance is large, the performance of the turbine 50 decreases. Accordingly, the performance of the turbine 50 depends on a size of the tip clearance. Therefore, the tip clearance is measured in a manufacturing process of the turbine 50.

Next, an operating state reproducing structure for bringing a state of the compressor 10 into a state suitable for measuring the tip clearance will be described.

As illustrated in FIG. 3, the operating state reproducing structure has a columnar through-hole 28 that penetrates the compressor casing 20 in the radial direction Dr, an eccentric pin 80 to be inserted into the through-hole 28, and a lid 89 that closes a portion on the radially outer side Dro of the through-hole 28.

Figure 4:
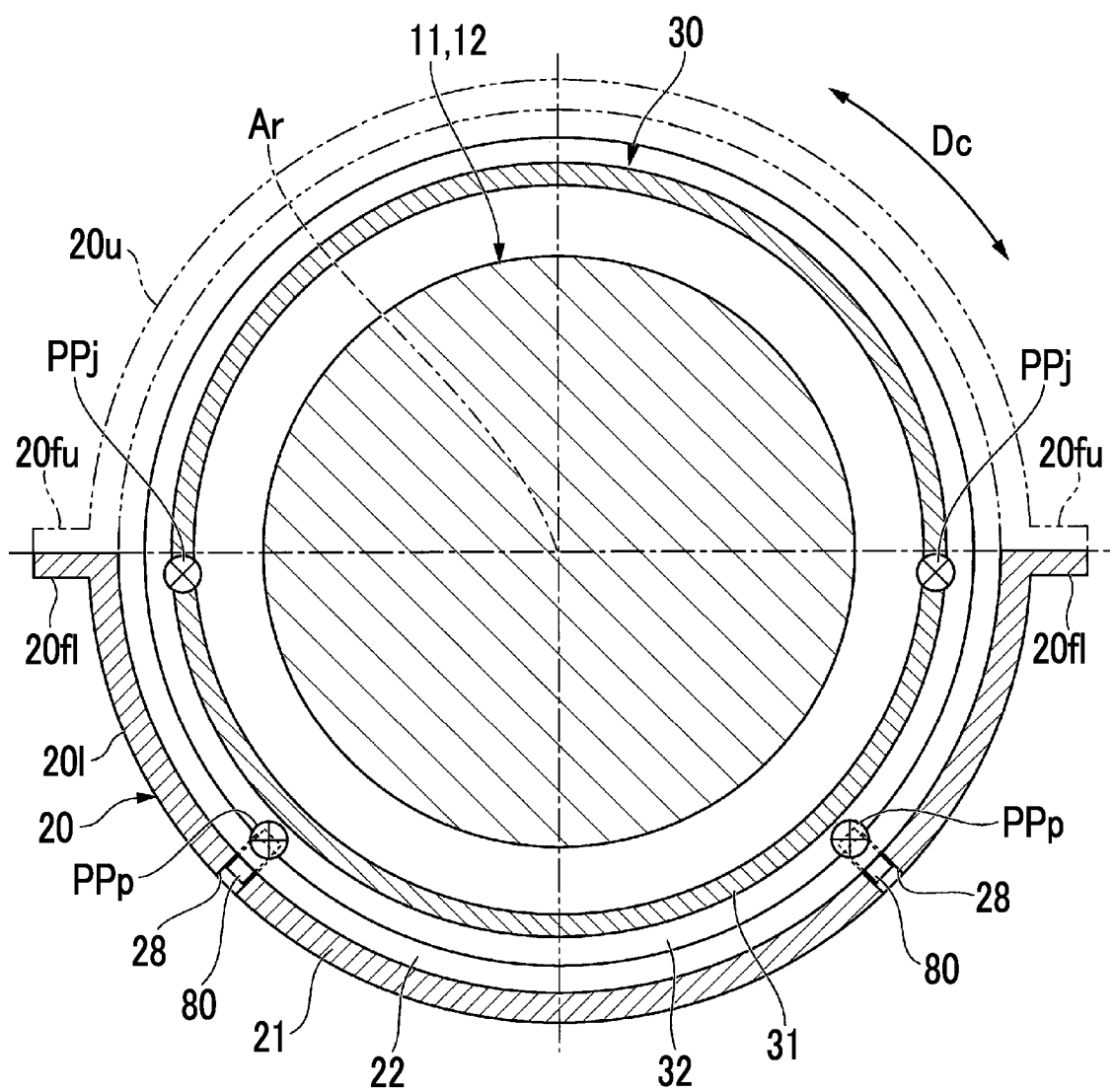
FIG. 4 is a sectional view taken along line IV-IV in FIG. 2.

As illustrated in FIG. 4, the compressor casing 20 has an upper half casing 20$u$ and a lower half casing 20$l$. The upper half casing 20$u$ configures an upper half of the compressor casing 20 with reference to the rotor axis Ar. In addition, the lower half casing 20$l$ configures a lower half of the compressor casing 20 with reference to the rotor axis Ar. Both ends of the upper half casing 20$u$ in the circumferential direction Dc has a flange 20$fu$ projecting to the radially outer side Dro. In addition, both ends of the lower half casing 20$l$ in the circumferential direction Dc also has a flange 20$fl$ projecting to the radially outer side Dro. The upper half casing 20$u$ and the lower half casing 20$l$ are joined together in such a way that the flanges 20$fu$ and 20$fl$ are connected to each other by bolts. According to the present embodiment, the through-hole 28 of the above-described compressor casing 20 is formed at two positions different from each other in the circumferential direction Dc in the lower half casing 20$l$. The plurality of the retainer rings 30 are configured so that a plurality of portion retainer rings are aligned in the circumferential direction Dc. In other words, one portion retainer ring configures a portion of the retainer ring 30 in the circumferential direction.

Figure 5:
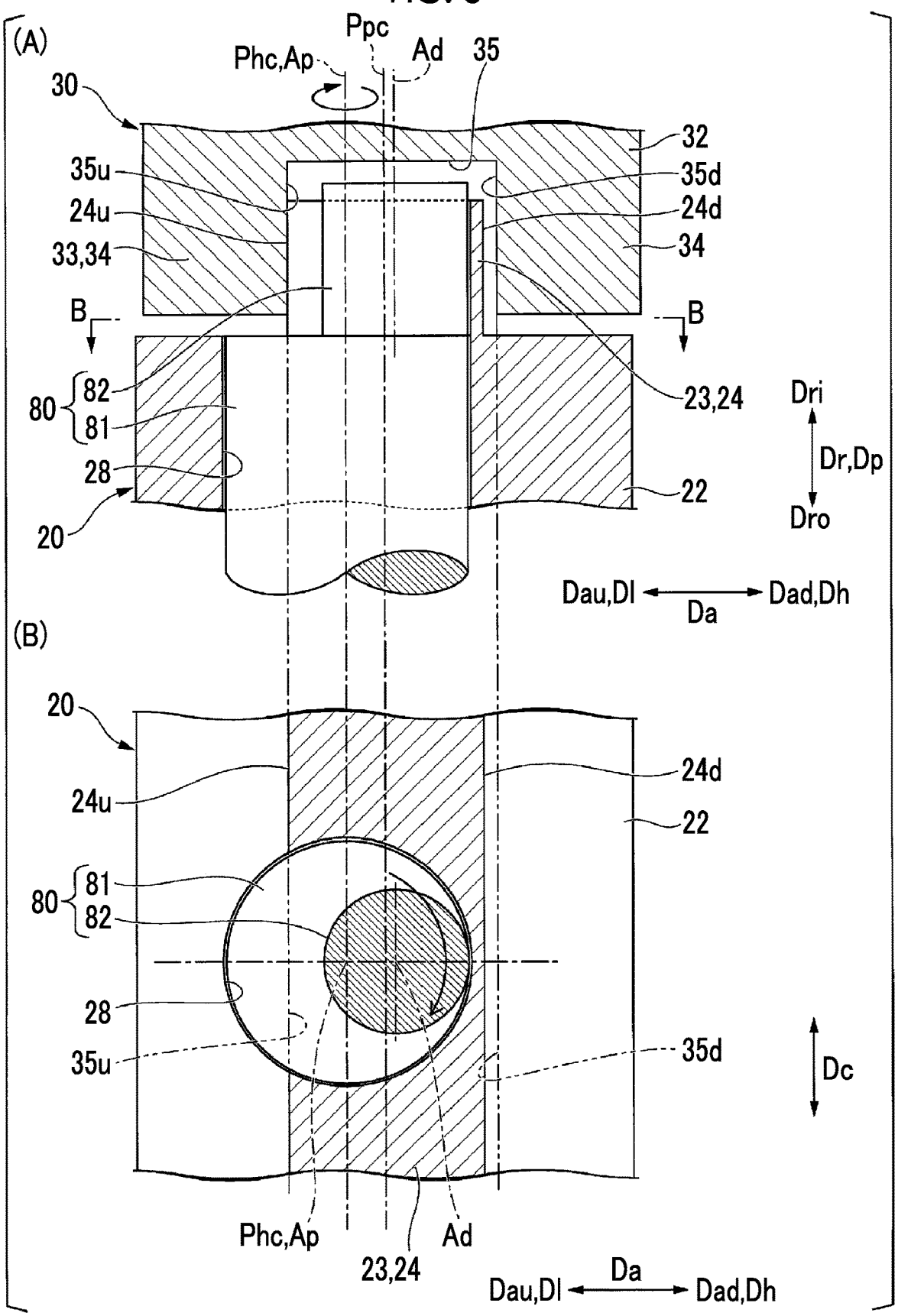
FIG. 5 illustrates an operating state reproducing structure before an operating state is reproduced according to the first embodiment of the present invention.
Figure 7:
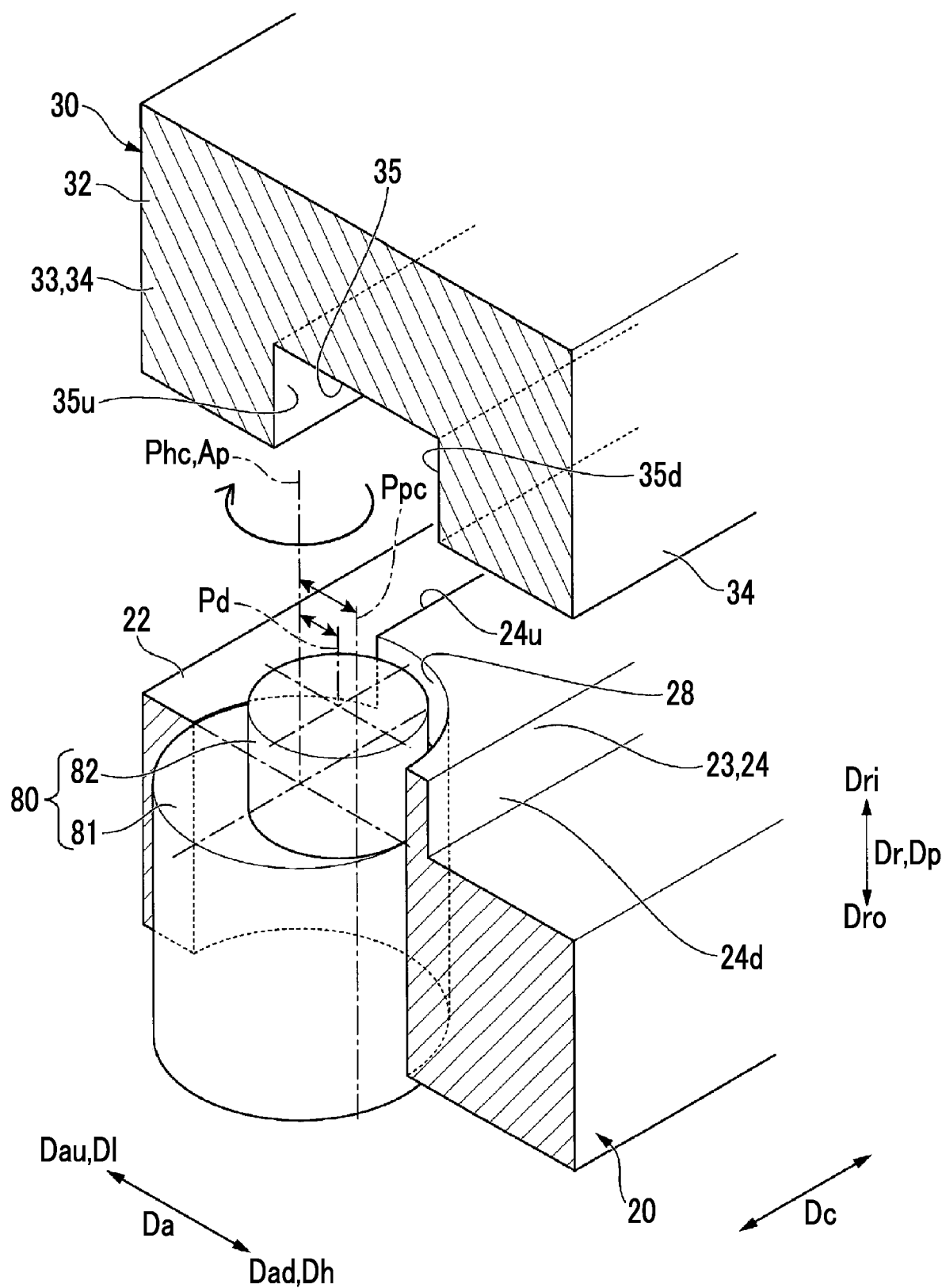
FIG. 7 is a perspective view illustrating a main part of the operating state reproducing structure according to the first embodiment of the present invention.

As illustrated in FIGS. 3, 5, and 7, a penetration center position Phc which is a position of the central axis of the through-hole 28 is a position biased to the axially upstream side Dau (low-pressure side Dal) inside a region where the engaging portion 23 is formed in the compressor casing 20 in the axial direction Da. Here, the position biased to the axially upstream side Dau is a position slightly separated to the axially upstream side Dau from a center position Ppc of the engaging portion 23 of the compressor casing 20 in the axial direction Da. In addition, the center position Ppc of the engaging portion 23 of the compressor casing 20 in the axial direction Da is a center position of the projecting portion 24 belonging to the engaging portion 23 in the axial direction Da, that is, a projecting width center position. Accordingly, the penetration center position Phc is a position slightly separated to the axially upstream side Dau (low-pressure side Dal) from the projecting width center position Ppc inside the region where the engaging portion 23 is formed in the compressor casing 20.

As illustrated in FIGS. 5 and 7, the projecting portion 24 extending in the circumferential direction Dc has a pair of surfaces 24u and 24d facing each other in the axial direction Da. Out of the pair of surfaces 24u and 24d, one surface is an upstream end surface 24u located on the axially upstream side Dau from the other surface, and facing the axially upstream side Dau. In addition, the other surface is a downstream end surface 24d located on the axially downstream side Dad from the upstream end surface 24u, and facing the axially downstream side Dad. The groove 35 which the projecting portion 24 enters has a pair of surfaces 35u and 35d facing each other in the axial direction Da. Out of the pair of surfaces 35u and 35d, one surface is an upstream groove side surface 35u located on the axially upstream side Dau from the other surface, and facing the axially downstream side Dad. In addition, the other surface is a downstream groove side surface 35d located on the axially downstream side Dad from the upstream groove side surface 35u, and facing the axially upstream side Dau. In a state where the projecting portion 24 enters the groove 35, the upstream end surface 24u of the projecting portion 24 and the upstream groove side surface 35u of the groove 35 face each other in the axial direction Da. The downstream end surface 24d of the projecting portion 24 and the downstream groove side surface 35d of the groove 35 face each other in the axial direction Da.

The projecting portion 24 is partially cut out due to the through-hole 28. Specifically, on the upstream end surface 24u of the projecting portion 24, a portion including the penetration center position Phc is cut out in the circumferential direction Dc. The upstream end surface 24u of the projecting portion 24 is located on the axially upstream side Dau (low-pressure side Dl) in the axial direction Da from the penetration center position Phc. On the other hand, the downstream end surface 24d of the projecting portion 24 is present throughout the entire area in the circumferential direction Dc, and has no cutout portion unlike the upstream end surface 24u. The downstream end surface 24d of the projecting portion 24 is located on the axially downstream side Dad (high-pressure side Dh) from the penetration center position Phc in the axial direction Da.

The eccentric pin 80 has a columnar pin main body 81 that can be inserted into the through-hole 28, and an eccentric portion 82 formed in an end of the pin main body 81 in a pin extending direction Dp in which a pin central axis Ap of the pin main body 81 extends. An outer diameter of the columnar pin main body 81 is substantially the same as an inner diameter of the through-hole 28. Therefore, if the pin main body 81 is inserted into the through-hole 28, the pin central axis Ap and the penetration center position Phc of the through-hole 28 substantially coincide with each other. In addition, if the pin main body 81 is inserted into the through-hole 28, an outer peripheral surface of the pin main body 81 and an inner peripheral surface of the through-hole 28 come into contact with each other. The eccentric portion 82 has a columnar shaped formed around an eccentric axis Ad parallel to the pin central axis Ap and separated from the pin central axis Ap. The outer diameter of the eccentric portion 82 is smaller than the outer diameter of the pin main body 81. As illustrated in FIG. 3, a wrench hole 83 recessed toward the eccentric portion 82 side is formed in an end of the pin main body 81 in the pin extending direction Dp, which is an end opposite to a side having the eccentric portion 82.

The total length of the eccentric pin 80 in the pin extending direction Dp is a length that causes eccentric pin 80 to interfere with the lid 89 when the eccentric pin 80 is inserted into the through-hole 28 and the eccentric pin 80 is pushed most into the radially inner side Dri and the lid 89 closes the through-hole 28 the through-hole 28.

Figure 8:
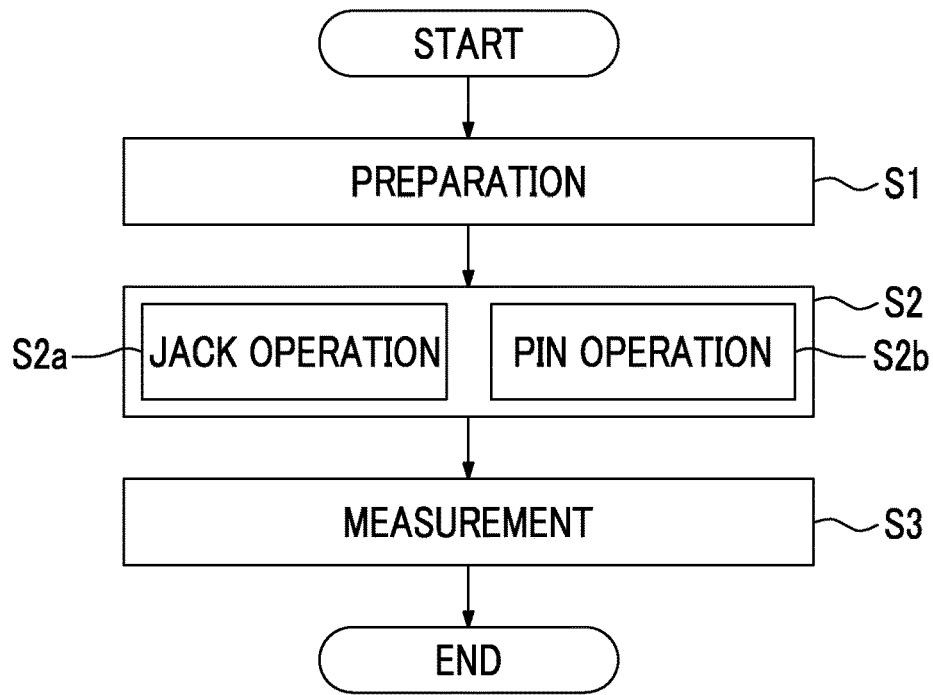
FIG. 8 is a flowchart illustrating a procedure of a tip clearance measuring method according to the first embodiment of the present invention.

Next, a procedure for measuring the tip clearance in a manufacturing process of the compressor 10 will be described with reference to a flowchart illustrated in FIG. 8.

Figure 9:
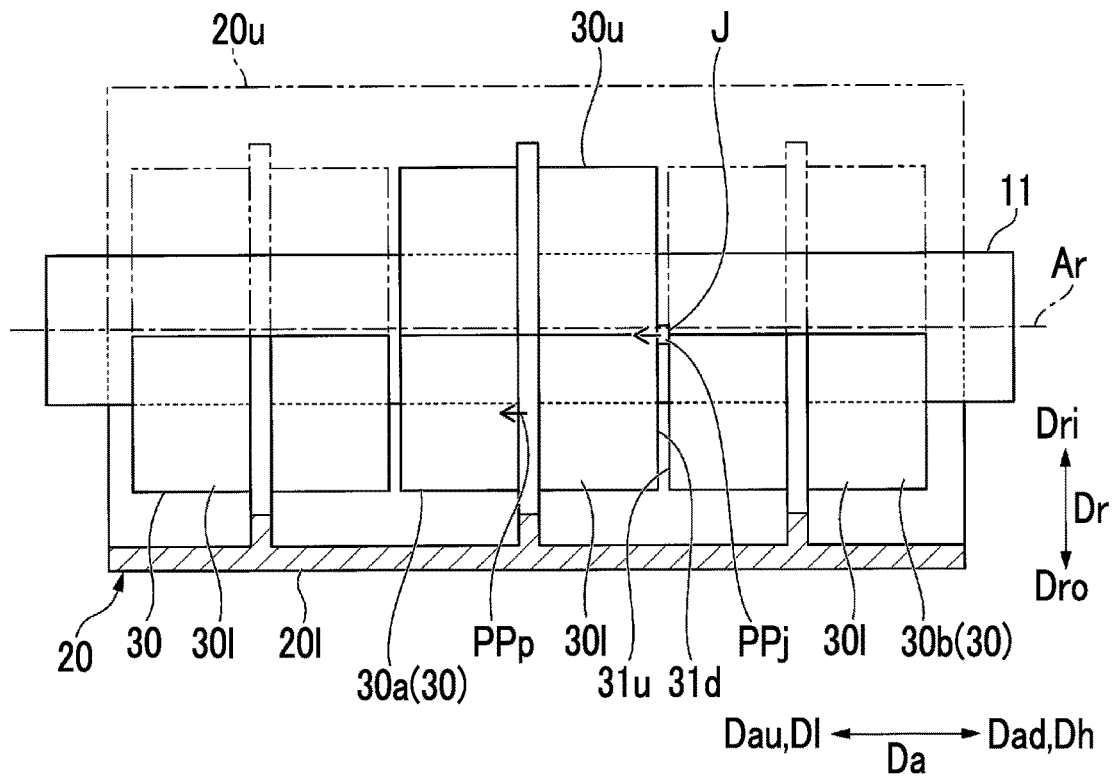
FIG. 9 is a schematic sectional view of a compressor when an operating state reproducing step is performed according to the first embodiment of the present invention.

First, the compressor 10 is assembled in a state where the tip clearance can be measured (S1: preparation step). In the preparation step (S1), as illustrated in FIG. 9, the lower half casing 20l is first installed in an installation place. Next, each lower portion retainer ring 30l of the plurality of the retainer rings 30 is attached to the inside of the lower half casing 20l. Next, the compressor rotor 11 is installed. Then, the upper portion retainer ring 30u of one retainer ring 30 out of the plurality of retainer rings 30 is connected to the lower portion retainer ring 30l. That is, only one retainer ring 30 is assembled out of the plurality of retainer rings 30. Here, the compressor 10 includes three retainer rings 30. Out of the three retainer rings 30, only the retainer ring 30a located in the middle in the axial direction Da is assembled, and the retainer ring 30a is used as a tip clearance measurement target.

According to the above-described procedure, the preparation step is completed (S1). If the preparation step (S1) is completed, the compressor in this state is brought into a state suitable for the tip clearance measurement (S2: an operating state reproducing step).

Figure 6:
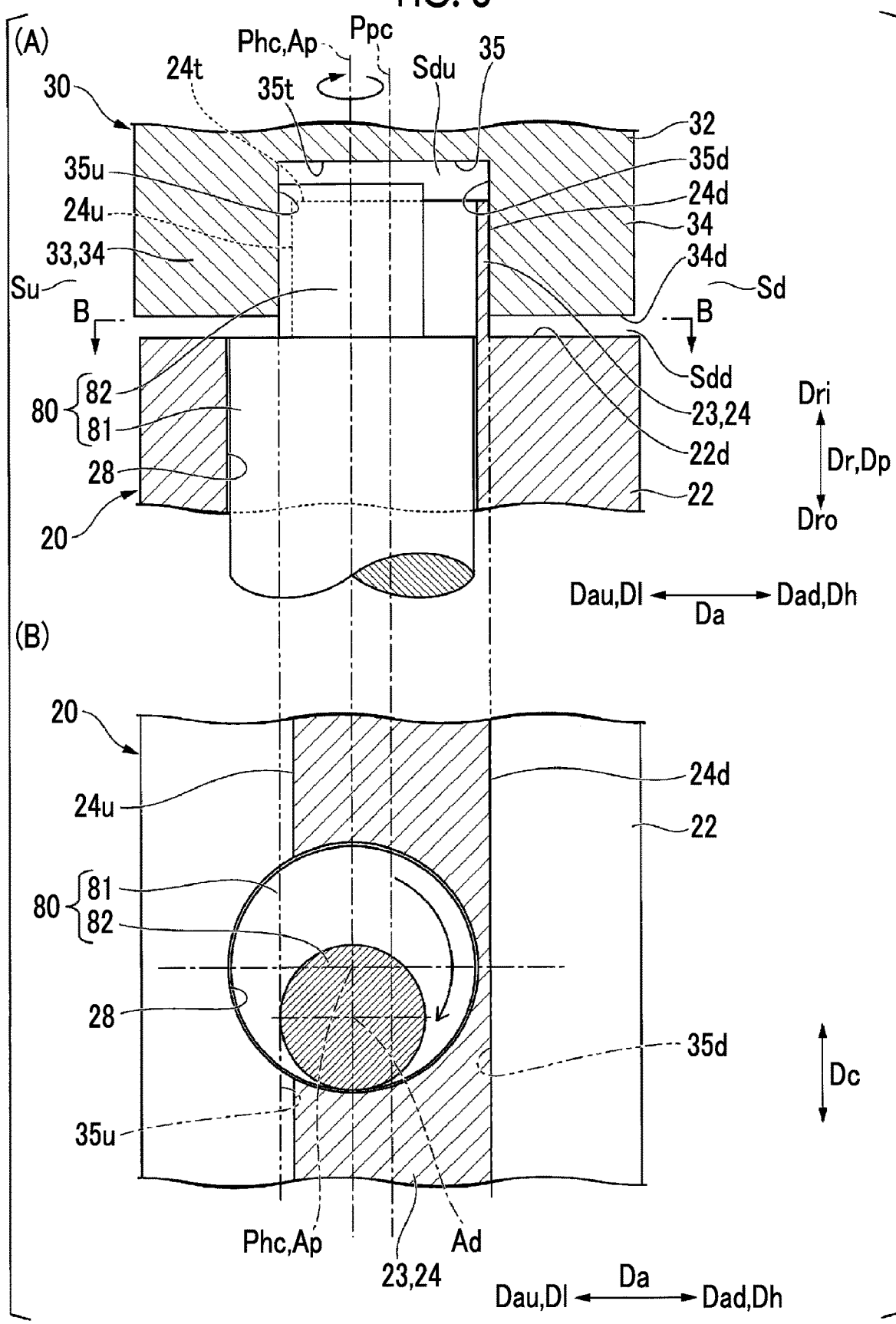
FIG. 6 illustrates the operating state reproducing structure when the operating state is reproduced according to the first embodiment of the present invention.

If the compressor rotor 11 rotates, as described above, the air A flows through the air compression flow path 39 from the axially upstream side Dau to the axially downstream side Dad. The pressure of air A gradually increases as the air A flows to the axially downstream side Dad. Accordingly, in the compressor 10 in the operating state, with reference to one of the stator blades 19, the axially downstream side Dad becomes the high-pressure side Dah, and the axially upstream side Dau becomes the low-pressure side Dal. That is, in the compressor 10 in the operating state, with reference to one of the stator blades 19, a pressure difference occurs between the space on the axially downstream side Dad and the space on the axially upstream side Dau. Therefore, in the compressor 10 in the operating state, a force oriented toward the axially upstream side Dau force is applied to the stator blade 19. Incidentally, as described above, even in a state where the compressor casing 20 and the retainer ring 30 engage with each other, the retainer ring 30 is slightly and relatively movable with respect to the compressor casing 20. The compressor casing 20 is fixed to the turbine casing 60. However, the retainer ring 30 is held so as to be movable in the axial direction Da with respect to the compressor casing 20. Therefore, the retainer ring 30 receives the force corresponding to the above-described pressure difference in the axially upstream side Dau direction. The retainer ring 30 moves in a direction to the axially upstream side Dau direction, until the downstream groove side surface 35d of the groove 35 of the retainer ring 30 comes into contact with the downstream end surface 24d of the projecting portion 24 of the compressor casing 20. That is, the retainer ring 30 that holds the stator blade 19 slightly and relatively moves to the axially upstream side Dau (low-pressure side Dal) with respect to the compressor casing 20 due to the force oriented toward the axially upstream side Dau which is applied to the stator blade 19. As a result, in the compressor 10 in the operating state, as illustrated in FIG. 6, the downstream groove side surface 35d of the groove 35 in the retainer ring 30 and the downstream end surface 24d of the projecting portion 24 in the compressor casing 20 come into contact with each other. In a state where the downstream groove side surface 35d of the groove 35 and the downstream end surface 24d of the projecting portion 24 are in contact with each other, with reference to positions of both surfaces 24d and 35d, the same pressure difference as described above occurs between the space on the axially downstream side Dad and the space on the axially upstream side Dau.

As illustrated in FIGS. 3 and 6, within the space between the retainer ring 30 and the compressor casing 20 in the radial direction Dr, the air A flowing from the air compression flow path 39 flows into a downstream-side space Sd on the axially downstream side Dad with reference to the engaging portions 23 and 33 of the retainer ring 30 and the compressor casing 20. In the compressor 10 in the operating state, as described above, the downstream groove side surface 35d of the groove 35 and the downstream end surface 24d of the projecting portion 24 are in contact with each other, and the downstream groove side surface 35d of the groove 35 and the downstream end surface 24d of the projecting portion 24 are present throughout the entire area in the circumferential direction Dc. Accordingly, the air flowing into the downstream-side space Sd can be prevented from flowing out to an upstream-side space Su via the engaging portions 23 and 33 of the retainer ring 30 and the compressor casing 20. That is, in the compressor 10 in the operating state, the downstream groove side surface 35d of the groove 35 and the downstream end surface 24d of the projecting portion 24 serve as a sealing surface that prevents the air present inside the downstream-side space Sd from flowing out to the upstream-side space Su. In addition, as described above, in a state where the downstream groove side surface 35d of the groove 35 and the downstream end surface 24d of the projecting portion 24 are in contact with each other, with reference to the positions of both surfaces 24d and 35d, a pressure difference occurs between the space on the axially downstream side Dad and the space on the axially upstream side Dau. Specifically, the same pressure difference as described above occurs between an upstream-side clearance space Sdu formed between a bottom surface 35t facing the radially outer side Dro of the groove 35 and an inner end surface 24t facing the radially inner side Dri of the projecting portion 24, so as to communicate with the upstream-side space Su, and a downstream-side clearance space Sdd formed between an outer end surface 34d facing the radially outer side Dro of the wall plate portion 34 on the axially downstream side Dad and an inner end surface 22d facing the radially inner side Dri of the casing leg portion 22 so as to communicate with the downstream-side space Sd. As described above, the downstream groove side surface 35d of the groove 35 and the downstream end surface 24d of the projecting portion 24 which come into contact with each other due to the force generated by the pressure difference serve as the sealing surface.

The inner diameter of the inner peripheral surface of the retainer ring 30 which is one of measurement base points in the tip clearance measurement varies depending on a position in the axial direction Da. Therefore, if the relative position of the axial direction Da of the retainer ring 30 with respect to the compressor casing 20 varies when the tip clearance is measured and when the compressor 10 is operated, the tip clearance cannot be measured in the compressor 10 in the operating state.

Therefore, according to the present embodiment, the operating state reproducing step (S2) is performed. In this manner, the relative position of the retainer ring 30 in the axial direction Da with respect to the compressor casing 20 is set to a position located during the operation of the compressor 10. Specifically, in the operating state reproducing step (S2), as illustrated in FIG. 4, the retainer ring 30 is pushed to the axially upstream side Dau (low-pressure side Dl) from mutually different four push positions PPj and PPp in the circumferential direction Dc. When the retainer ring 30 is pushed to the axially upstream side Dau (low-pressure side Dl), in the operating state reproducing step (S2), a jack J is used to simultaneously perform a jack operating step (S2b) of pushing the retainer ring 30 to the axially upstream side Dau and a pin operating step (S2a) of pushing the retainer ring 30 to the axially upstream side Dau by using the eccentric pin 80. Out of four push positions PPj and PPp, two push positions PPj are push positions of the jack J, and the remaining two push positions PPj are push positions of the eccentric pin 80.

In the jack operating step (S2a), as shown in FIGS. 4 and 9, the jack J is first disposed at each of the two push positions PPj. Here, the jack J is disposed between the retainer ring 30a in the middle in the axial direction Da which is a measurement target and the lower portion retainer ring 30l of the downstream-side retainer ring 30b adjacent to the axially downstream side Dad of the retainer ring 30a. In a stage where the preparation step (S1) is completed, a lower portion between the retainer ring 30a serving as the measurement target and the lower portion retainer ring 30l of the downstream-side retainer ring 30b is covered by the lower half casing 20l. Accordingly, the jack J cannot be disposed. Therefore, in the jack operating step (S2a), the jack J is disposed in upper portions of the lower portion retainer ring 30l, that is, both end portions in the circumferential direction Dc of the lower portion retainer ring 30l, between a downstream-side end surface (high-pressure side end surface) 31d of the retainer ring 30a serving as the measurement target and an upstream-side end surface (low-pressure side end surface) 31u of the lower portion retainer ring 30l of the downstream-side retainer ring 30b. As illustrated in FIGS. 4 and 9, the position where the jack J is disposed in this way is the push position PPj of the jack J.

If the two jacks J are completely disposed, the two jacks J are operated. On the high-pressure side end surface 31d of the retainer ring 30a serving as the measurement target, an operating end of the jack J is brought into contact with the push position PPj, and the push position PPj is pushed to the axially upstream side Dau (low-pressure side Dal).

Figure 10:
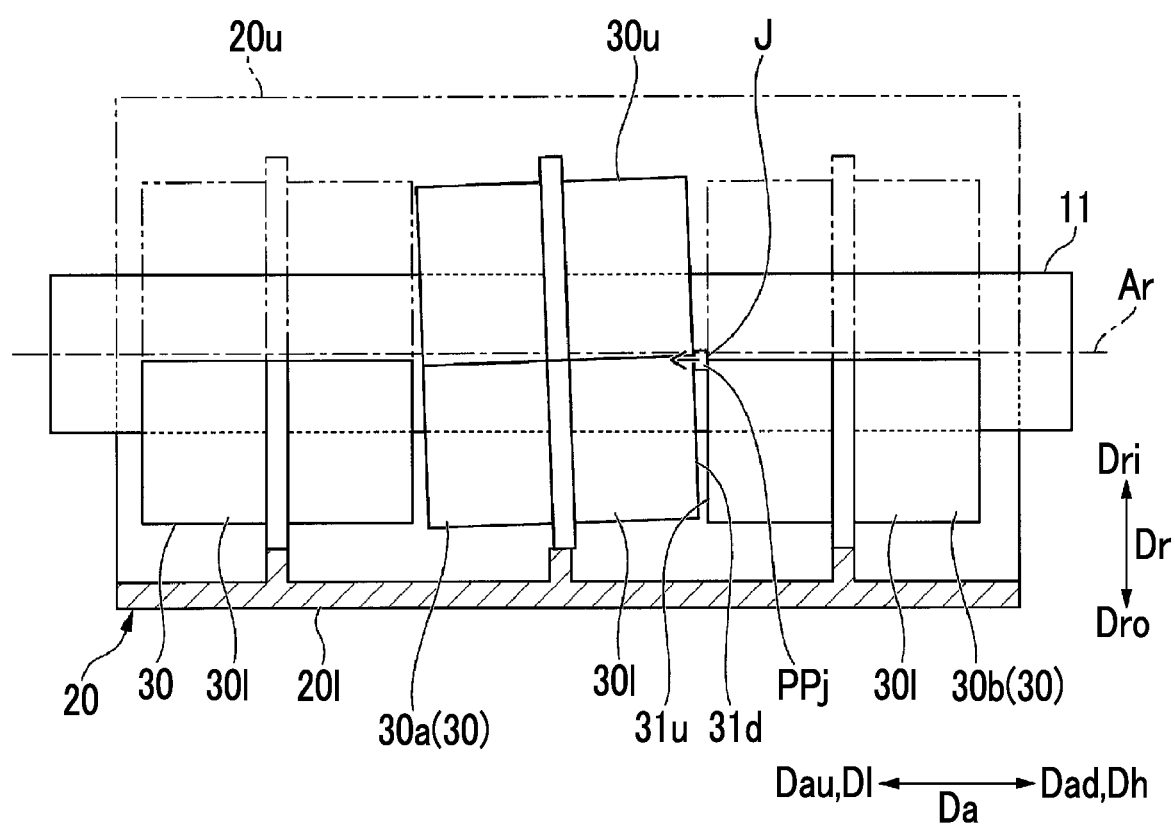
FIG. 10 is a schematic sectional view of the compressor when the operating state reproducing step is performed by using only a jack.

Incidentally, if the retainer ring 30a serving as the measurement target is pushed to the axially upstream side Dau (low-pressure side Dal) by using only the two jacks J, as illustrated in FIG. 10, the central axis of the cylindrical retainer ring 30a is inclined with respect to the rotor axis Ar. Consequently, the tip clearance C cannot be accurately measured.

Therefore, according to the present embodiment, as illustrated in FIGS. 4 and 9, a position below the push position PPj of the jack J within the retainer ring 30a serving as the measurement target is used as the push position PPp of the eccentric pin 80, and the push position PPp is pushed by the eccentric pin 80. As illustrated in FIGS. 3 and 4, in the pin operating step (S2b), the eccentric pin 80 is inserted into the two through-holes 28 of the compressor casing 20. At this time, the eccentric portion 82 of the eccentric pin 80 is inserted into the through-hole 28 by causing the eccentric portion 82 of the eccentric pin 80 to face the radially inner side Dri. Then, the eccentric pin 80 is rotated inside the through-hole 28. That is, the eccentric pin 80 is relatively displaced with respect to the inner peripheral surface of the through-hole 28. At this time, a tip of a wrench is inserted into the wrench hole 83 of the eccentric pin 80, and the wrench is operated to rotate the eccentric pin 80 inside the through-hole 28.

In a stage where the preparation step (S1) is completed, the projecting portion 24 of the compressor casing 20 is located at any position in the axial direction Da inside the groove 35 of the retainer ring 30. It is assumed as follows. As illustrated in FIG. 5, in the stage where the preparation step (S1) is completed, the upstream end surface 24u of the projecting portion 24 is in contact with the upstream groove side surface 35u of the groove 35, and the downstream end surface 24d of the projecting portion 24 is separated to the axially upstream side Dau from the downstream groove side surface 35d of the groove 35. That is, it is assumed that the retainer ring 30 is located on the most axially downstream side Dad (the high-pressure side Dh) with respect to the compressor casing 20. If the eccentric pin 80 is rotated around the pin central axis Ap (≅the penetration center position Phc), as illustrated in FIG. 6, the eccentric portion 82 of the eccentric pin 80 moves to the axially upstream side Dau. A portion of the eccentric portion 82 is located on the axially upstream side Dau (low-pressure side Dal) from the upstream end surface 24u of the projecting portion 24. Therefore, a portion of the eccentric portion 82 comes into contact with the upstream groove side surface 35u of the groove 35, and pushes the retainer ring 30 having the groove 35 to the axially upstream side Dau (low-pressure side Dal). As a result, the retainer ring 30 serving as the measurement target relatively moves to the axially upstream side Dau (low-pressure side Dal) with respect to the compressor casing 20, and the downstream end surface 24d of the projecting portion 24 comes into contact with the downstream groove side surface 35d of the groove 35. That is, a positional relationship in the axial direction Da between the retainer ring 30 serving as the measurement target and the compressor casing 20 is the same as that of the compressor 10 in the operating state at this stage.

If work is completely carried out in the operating state reproducing step (S2), as illustrated in FIG. 3, while maintaining a state where the work is realized, the tip clearance C is measured between the gas pass surface 31p of the retainer ring 30 serving as the measurement target and the tip of the rotor blade 14 facing the gas pass surface 31p (S3: measuring step). In the measuring step (S3), the tip clearance C is measured by using a clearance meter such as a commercially available clearance gauge. Any clearance meter may be used. For example, the clearance meter may be a capacitance type clearance meter that measures the tip clearance C by utilizing a fact that capacitance is changed between the gas pass surface 31p of the retainer ring 30 and the tip of the rotor blade 14 in accordance with a change in the tip clearance C.

According to the above-described procedure, the tip clearance measurement is completed in the manufacturing process of the compressor 10.

If the tip clearance obtained by the measuring step (S3) does not fall within an allowable range, work is carried out again to assemble the lower portion retainer ring 30l and the upper portion retainer ring 30u of the retainer ring 30a serving as the measurement target to each other. On the other hand, if the tip clearance obtained in the measuring step (S3) falls within the allowable range, the compressor 10 is completed by carrying out work such as assembling the upper half casing 20u to the lower half casing 20l. After the measuring step (S3), and before the work to complete the compressor 10, the eccentric pin 80 is removed from the through-hole 28 of the compressor casing 20, and the through-hole 28 is closed by the lid 89. As described above, the total length of the eccentric pin 80 in the pin extending direction Dp is the length that causes the eccentric pin 80 to interfere with the lid 89 when the eccentric pin 80 is pushed into the through-hole 28 and the lid 89 closes the through-hole 28. Therefore, if a worker forgets to remove the eccentric pin 80 from the through-hole 28, the through-hole 28 cannot be closed by the lid 89. Therefore, according to the present embodiment, the worker can be prevented from forgetting to remove eccentric pin 80 from the through-hole 28.

As described above, according to the present embodiment, even in the manufacturing process, the tip clearance C can be measured in a state close to the operating state of the compressor 10 by performing the operating state reproducing step (S2).

Second Embodiment

A second embodiment of the axial-flow fluid machine will be described with reference to FIGS. 11 and 12. The axial-flow fluid machine according to the following embodiments including the present embodiment is configured so that an operating state reproducing structure is different from that according to the first embodiment. Other structures are basically the same as the structures of the axial-flow fluid machine according to the first embodiment. Accordingly, hereinafter, the operating state reproducing structure will be mainly described.

The engaging portion 23 of the compressor casing 20 according to the first embodiment has the projecting portion 24. In addition, the engaging portion 33 of the retainer ring 30 according to the first embodiment has the pair of wall plate portions 34 forming the grooves 35. However, a disposition relationship between the projecting portion and the groove may be reversed. That is, as illustrated in FIGS. 11 and 12, the engaging portion 23a of the compressor casing 20 may have the pair of wall plate portion 25 forming the groove 26, and the engaging portion 33a of the retainer ring 30 may have the projecting portion 36. As described above, in the compressor 10 in the operating state, the force oriented toward the axially upstream side Dau is applied to the retainer ring 30 that holds the stator blade 19. Therefore, in the compressor 10 in the operating state, as illustrated in FIG. 12, due to the force oriented toward the axially upstream side Dau which is applied to the retainer ring 30, the upstream end surface 36u of the projecting portion 36 in the retainer ring 30 is brought into contact with the upstream groove side surface 26u of the groove 26 in the compressor casing 20.

The compressor 10 according to the present embodiment has the operating state reproducing structure in a case where the engaging portion 23a of the compressor casing 20 has the pair of wall plate portion 25 and the engaging portion 33a of the retainer ring 30 has the projecting portion 36. As in the operating state reproducing structure according to the first embodiment, the operating state reproducing structure according to the present embodiment has the columnar through-hole 28 that penetrates the compressor casing 20 in the radial direction Dr, the eccentric pin 80 to be inserted into the through-hole 28, and the lid 89 (refer to FIG. 3) that closes a portion on the radially outer side Dro of the through-hole 28.

In the present embodiment, the penetration center position Phc which is the position of the central axis of the through-hole 28 is the position biased to the axially downstream side Dad (high-pressure side Dah) inside the region where the engaging portion 23a is formed in the compressor casing 20 in the axial direction Da. Here, the position biased to the axially downstream side Dad is a position on the axially downstream side Dad from a center position Pcc in the axial direction Da of the engaging portion 23a of the compressor casing 20. In addition, the center position Pcc in the axial direction Da of the engaging portion 23a of the compressor casing 20 is a center position in the axial direction Da of the groove 26 formed by the engaging portion 23a, that is, a groove width center position. Accordingly, the penetration center position Phc is a position on the axially downstream side Dad (high-pressure side Dah) from the groove width center position Pcc, inside the region where the engaging portion 23a is formed in the compressor casing 20.

Out of the pair of wall plate portions 25 of the compressor casing 20, the wall plate portion 25 on the axially downstream side Dad (high-pressure side Dah) is partially cut out due to the through-hole 28. On the other hand, the wall plate portion 25 on the axially upstream side Dau (low-pressure side Dal) of the pair of wall plate portions 25 are present throughout the entire area in the circumferential direction Dc. Therefore, in the compressor 10 in the operating state, as described above, due to the force oriented toward the axially upstream side Dau which is applied to the retainer ring 30, the upstream end surface 36u of the projecting portion 36 in the retainer ring 30 and the upstream groove side surface 26u of the groove 26 in the compressor casing 20 come into contact with each other. In this manner, both surfaces 26u and 36u serve as the sealing surface.

The eccentric pin 80 according to the present embodiment is the same as the eccentric pin 80 according to the first embodiment.

In the present embodiment, the operating state reproducing step is performed after the preparation step, as in the first embodiment. In a stage where the preparation step is completed, the projecting portion 36 of the retainer ring 30 is located at any position of the axial direction Da inside the groove 26 of the compressor casing 20. It is assumed as follows. As illustrated in FIG. 11, in the stage where the preparation step is completed, the downstream end surface 36d of the projecting portion 36 is in contact with the downstream groove side surface 26d of the groove 26, and the upstream end surface 36u of the projecting portion 36 is separated to the axially downstream side Dad from the upstream groove side surface 26u of the groove 26. That is, it is assumed that the retainer ring 30 is located on the most axially downstream side Dad (high-pressure side Dh) with respect to the compressor casing 20. In the present embodiment, if the eccentric pin 80 is rotated around the pin central axis Ap (≡penetration center position Phc) in the pin operating step, as illustrated in FIG. 12, the eccentric portion 82 moves to the axially upstream side Dau. A portion of the eccentric portion 82 is located on the axially upstream side Dau (low-pressure side Dal) from the downstream groove side surface 26d of the groove 26. Therefore, a portion of the eccentric portion 82 comes into contact with the downstream end surface 36d of the projecting portion 36, and pushes the retainer ring 30 having the projecting portion 36 to the axially upstream side Dau (low-pressure side Dal). As a result, the retainer ring 30 relatively moves to the axially upstream side Dau (low-pressure side Dal) with respect to the compressor casing 20, and the upstream end surface 36u of the projecting portion 36 comes into contact with the upstream groove side surface 26u of the groove 26. That is, a positional relationship in the axial direction Da between the retainer ring 30 and the compressor casing 20 is the same as that of the compressor 10 in the operating state by performing the operating state reproducing step including the pin operating step.

Accordingly, in the present embodiment, the tip clearance can also be measured in a state close to the operating state of the compressor 10 by performing the operating state reproducing step.

Figure 11:
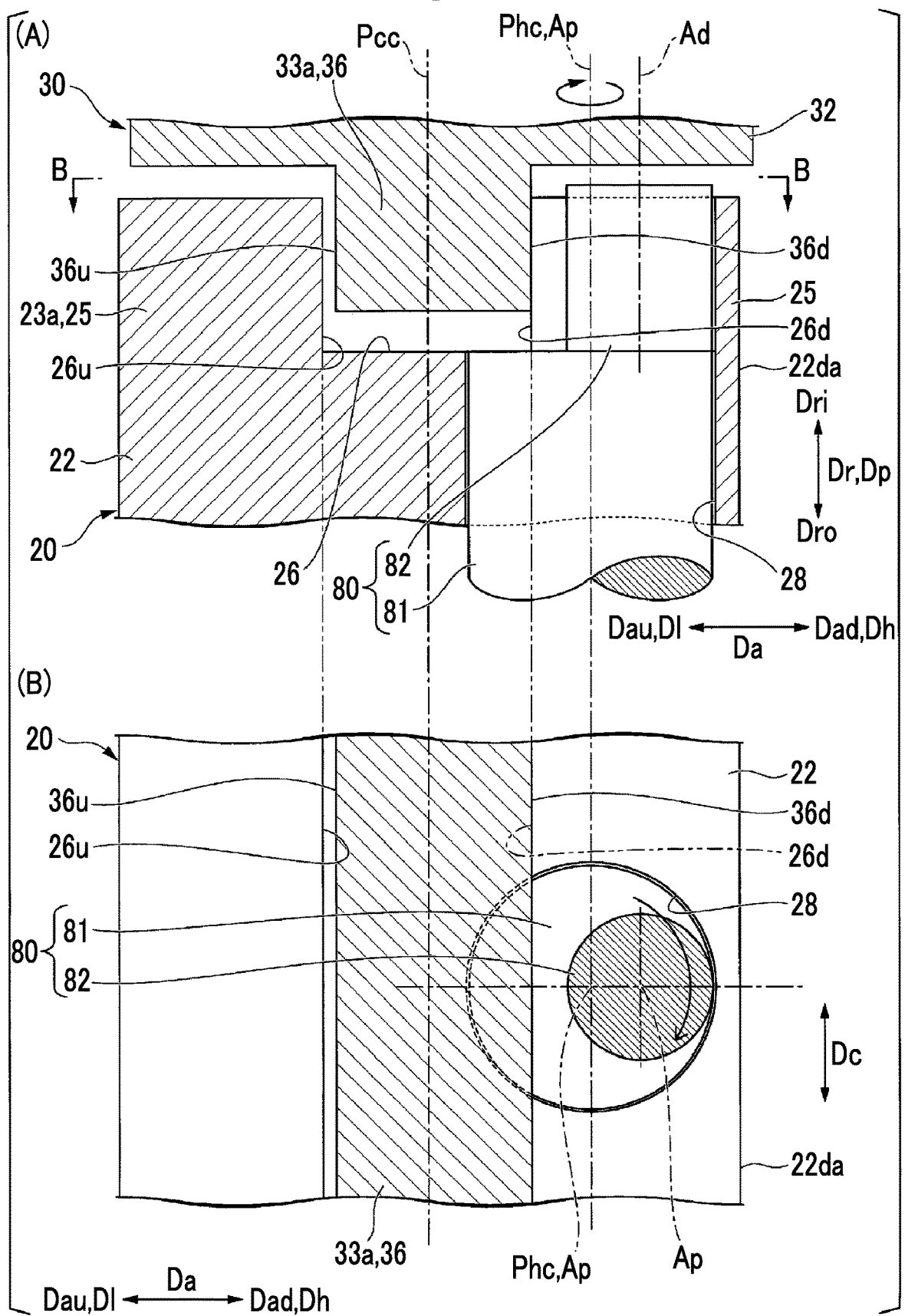
FIG. 11 illustrates an operating state reproducing structure before an operating state is reproduced according to a second embodiment of the present invention.
Figure 12:
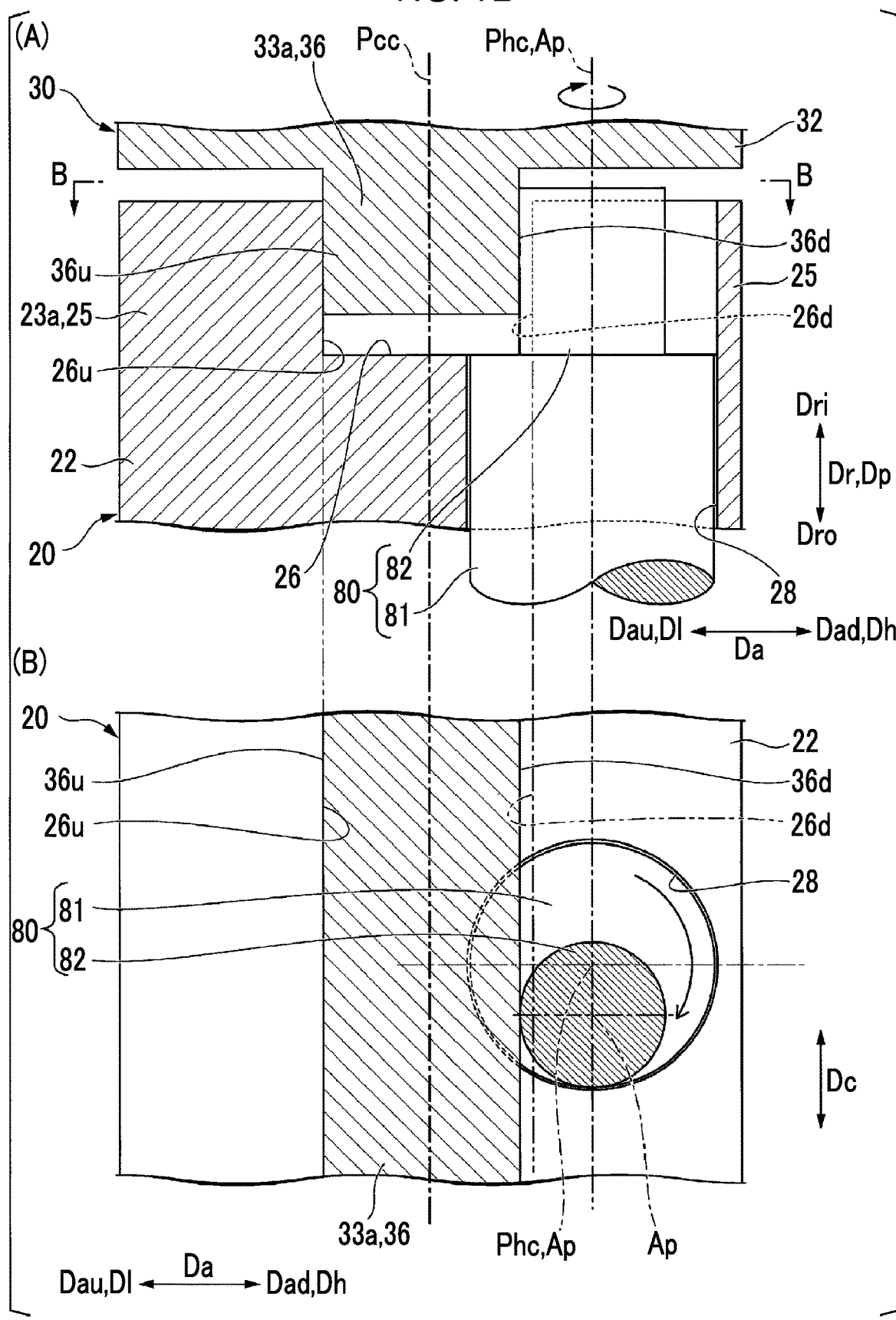
FIG. 12 illustrates the operating state reproducing structure when the operating state is reproduced according to the second embodiment of the present invention.

In the present embodiment, as illustrated in FIG. 11, the downstream end surface 22da which is a surface on the axially downstream side Dad in the casing leg portion 22 is present throughout the entire area in the circumferential direction Dc. However, the downstream end surface 22da may be partially cut out.

Figure 13:
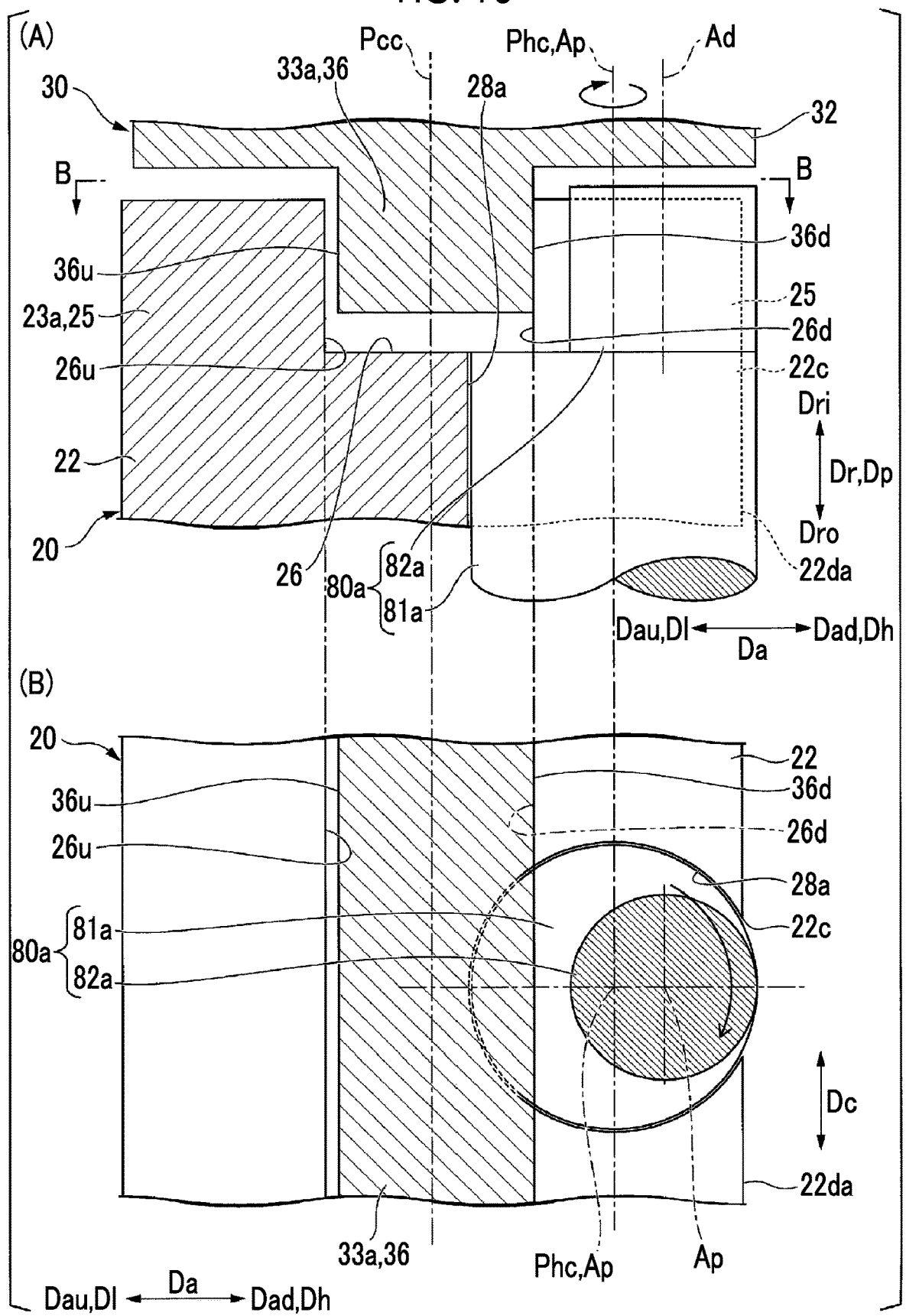
FIG. 13 illustrates an operating state reproducing structure before an operating state is reproduced according to a modification example in the second embodiment of the present invention.
Figure 14:
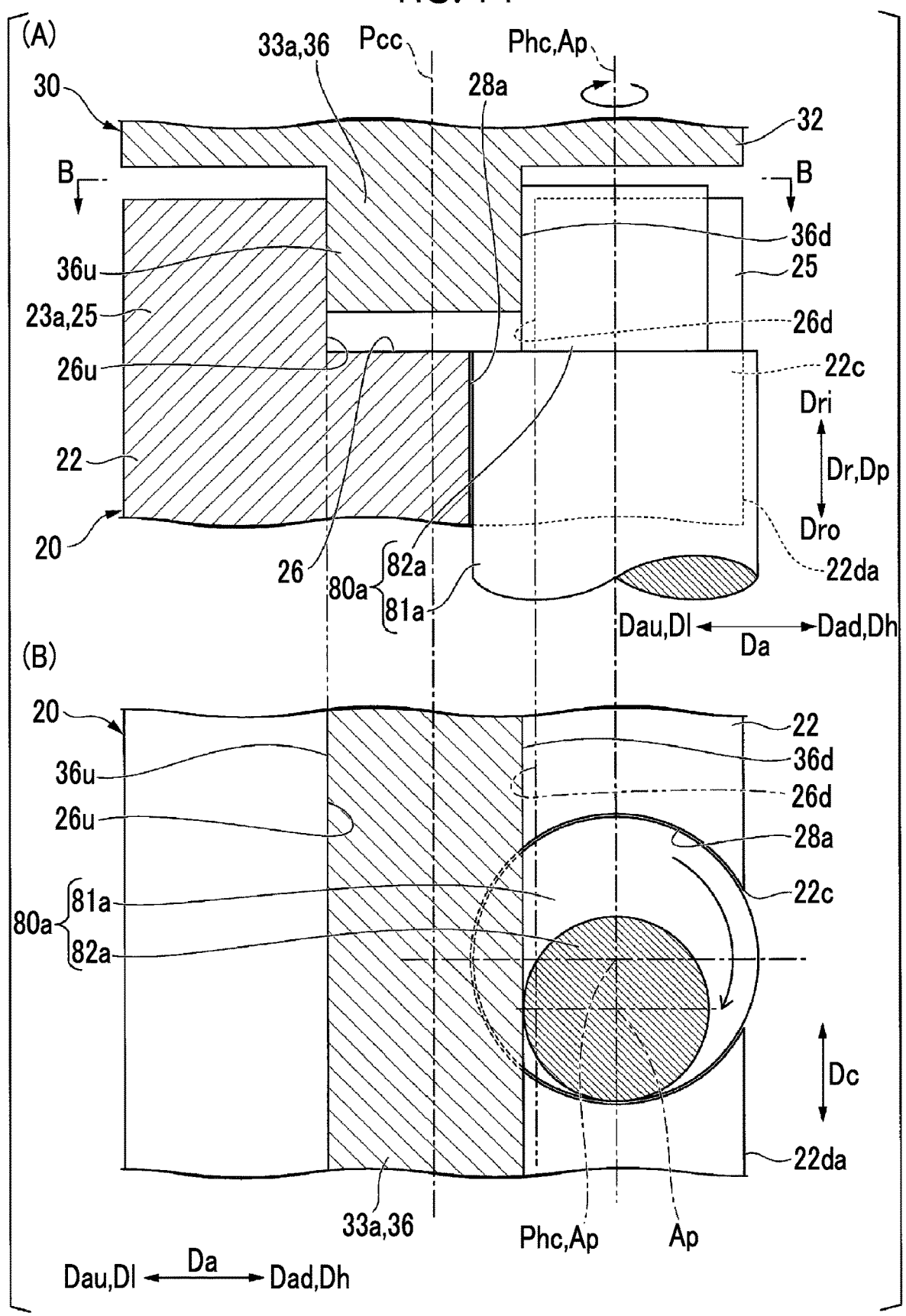
FIG. 14 illustrates the operating state reproducing structure when the operating state is reproduced according to the modification example in the second embodiment of the present invention.

In order to improve strength of the eccentric pin 80, the outer diameter of the eccentric pin 80 may need to increase in some cases. In this case, it is necessary to increase the diameter of the through-hole 28 of the casing leg portion 22 into which the eccentric pin 80 is inserted. If the diameter of the through-hole 28 increases, the above-described downstream end surface 22da may be partially cut out in some cases. Therefore, as a modification example according to the second embodiment, an example thereof will be described with reference to FIGS. 13 and 14.

The outer diameter of the pin main body 81a in the eccentric pin 80a according to the present modification example is larger than the outer diameter of the pin main body 81 in the eccentric pin 80 according to the second embodiment. In addition, the outer diameter of the eccentric portion 82a in the eccentric pin 80a according to the present modification example is larger than the outer diameter of the eccentric portion 82 in the eccentric pin 80 according to the second embodiment. Therefore, in the present modification example, the inner diameter of the through-hole 28a of the casing leg portion 22 into which the eccentric pin 80a is inserted is also larger than the inner diameter of the through-hole 28 in the casing leg portion 22 according to the second embodiment.

In the present modification example, the downstream end surface 22da of the casing leg portion 22 is partially cut out due to the through-hole 28a of the casing leg portion 22. A portion of the eccentric pin 80a projects to the axially downstream side Dad from a cutout portion 22c. Even if the downstream end surface 22da of the casing leg portion 22 is partially cut out in this way, the eccentric pin 80a can be rotated around the pin central axis Ap. Therefore, according to the present modification example, as in the second embodiment, the upstream end surface 36u of the projecting portion 36 and the upstream groove side surface 26u of the groove 26 can also be brought into contact with each other by rotating the eccentric pin 80a. In this manner, both surfaces 36u and 26u serve the sealing surface. That is, according to the present modification example, as in the second embodiment, the positional relationship in the axial direction Da between the retainer ring 30 and the compressor casing 20 is also the same as that of the compressor 10 in the operating state by performing the operating state reproducing step including the pin operating step.

Accordingly, in the present modification example, the tip clearance can also be measured in a state close to the operating state of the compressor 10 by performing the operating state reproducing step.

Third Embodiment

Figure 15:
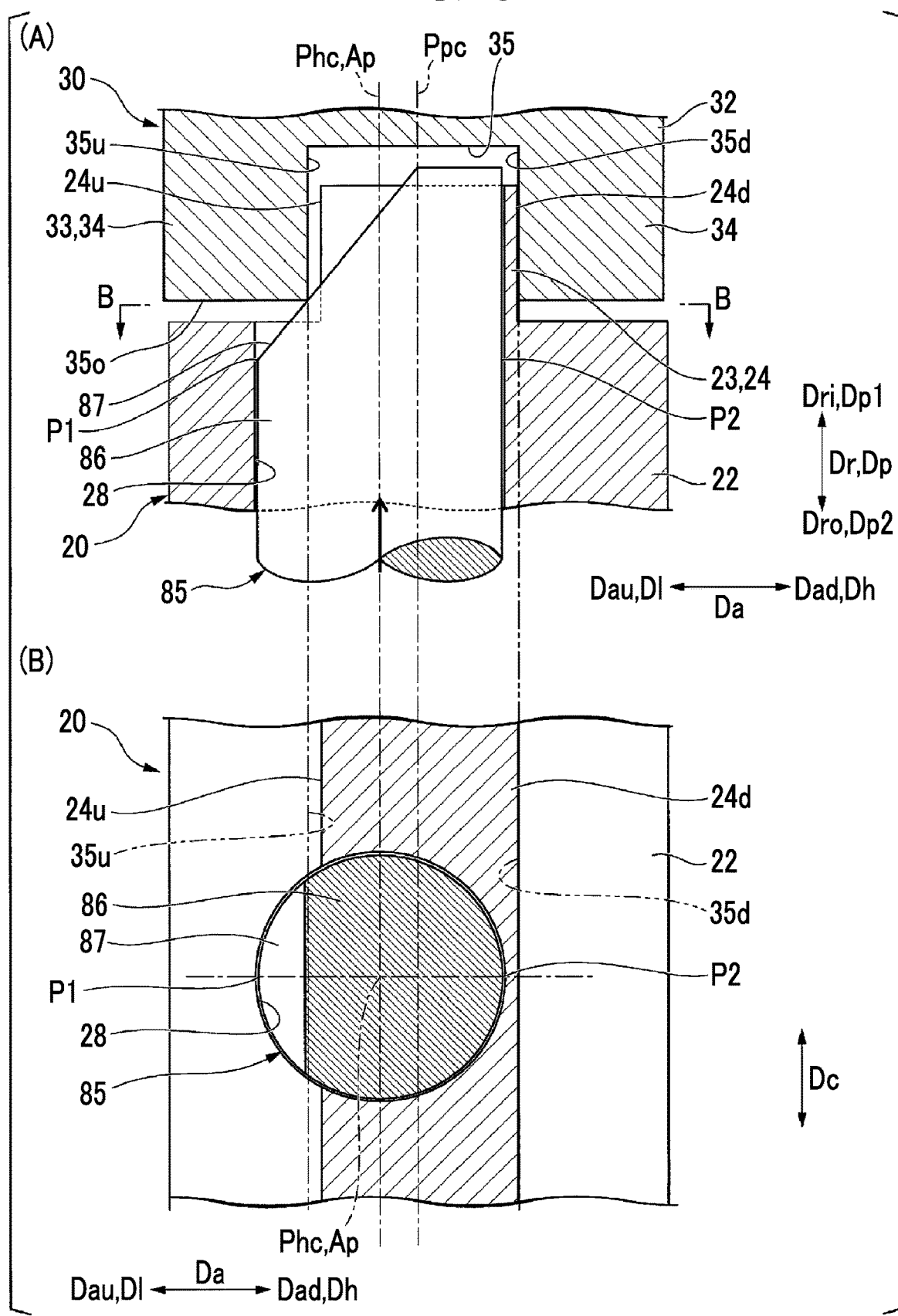
FIG. 15 illustrates an operating state reproducing structure when an operating state is reproduced according to a third embodiment of the present invention.

A third embodiment of the axial-flow fluid machine will be described with reference to FIG. 15.

The present embodiment is a modification example according to the first embodiment. In the operating state reproducing structure according to the first embodiment, the pin that is inserted into the through-hole 28 is the eccentric pin 80. On the other hand, in the operating state reproducing structure according to the present embodiment, the pin that is inserted into the through-hole 28 is a tapered pin 85. The operating state reproducing structure according to the present embodiment is the same as the operating state reproducing structure according to the first embodiment, except that the eccentric pin 80 of the operating state reproducing structure according to the first embodiment is replaced with the tapered pin 85.

The tapered pin 85 has a columnar pin main body 86 that can be inserted into the through-hole 28. In the pin main body 86, a first end portion on a first side Dp1 in the pin extending direction Dp in which the pin central axis Ap extends has a tapered surface 87 inclined with respect to the pin extending direction Dp. As the tapered surface 87 is tapered from a second side Dp2 toward the first side Dp1 in the pin extending direction Dp, the tapered surface 87 is gradually inclined to a side from a first point p1 toward a second point p2, which are point-symmetric with each other around the pin central axis Ap on the outer peripheral surface of the pin main body 86.

In the pin operating step according to the present embodiment, the first end portion of the tapered pin 85 is directed to the radially inner side Dri, and the tapered surface 87 is directed to the axially upstream side Dau (low-pressure side Dal). In this manner, the tapered pin 85 is pushed into the through-hole 28. That is, the tapered pin 85 is relatively moved with respect to the inner peripheral surface of the through-hole 28. During a process of pushing the tapered pin 85 into the through-hole 28, the tapered surface 87 of the tapered pin 85 comes into contact with the wall plate portion 34 of the axially upstream side Dau (low-pressure side Dal) out of the pair of wall plate portions 34 of the retainer ring 30. Specifically, out of the wall plate portion 34 on the axially upstream side Dau (low-pressure side Dal), the tapered surface 87 comes into contact with a corner between a radially outer side surface 35o facing the radially outer side Dro and the upstream groove side surface 35u. Even after the tapered surface 87 comes into contact with the corner, if the tapered pin 85 is pushed into the through-hole 28, a position in contact with the corner on the tapered surface 87 moves to the axially upstream side Dau. Therefore, since the tapered pin 85 is pushed into the through-hole 28, the retainer ring 30 having the wall plate portion 34 is pushed to the axially upstream side Dau (low-pressure side Dal) by the tapered pin 85. The retainer ring 30 relatively moves to the axially upstream side Dau (low-pressure side Dal) with respect to the compressor casing 20. Accordingly, the downstream end surface 24d of the projecting portion 24 comes into contact with the downstream groove side surface 35d of the groove 35. That is, the positional relationship in the axial direction Da between the retainer ring 30 and the compressor casing 20 is the same as that of the compressor 10 in the operating state by performing the operating state reproducing step including the pin operating step.

Accordingly, in the present embodiment, the tip clearance can also be measured in a state close to the operating state of the compressor 10 by performing the operating state reproducing step.

Fourth Embodiment

Figure 16:
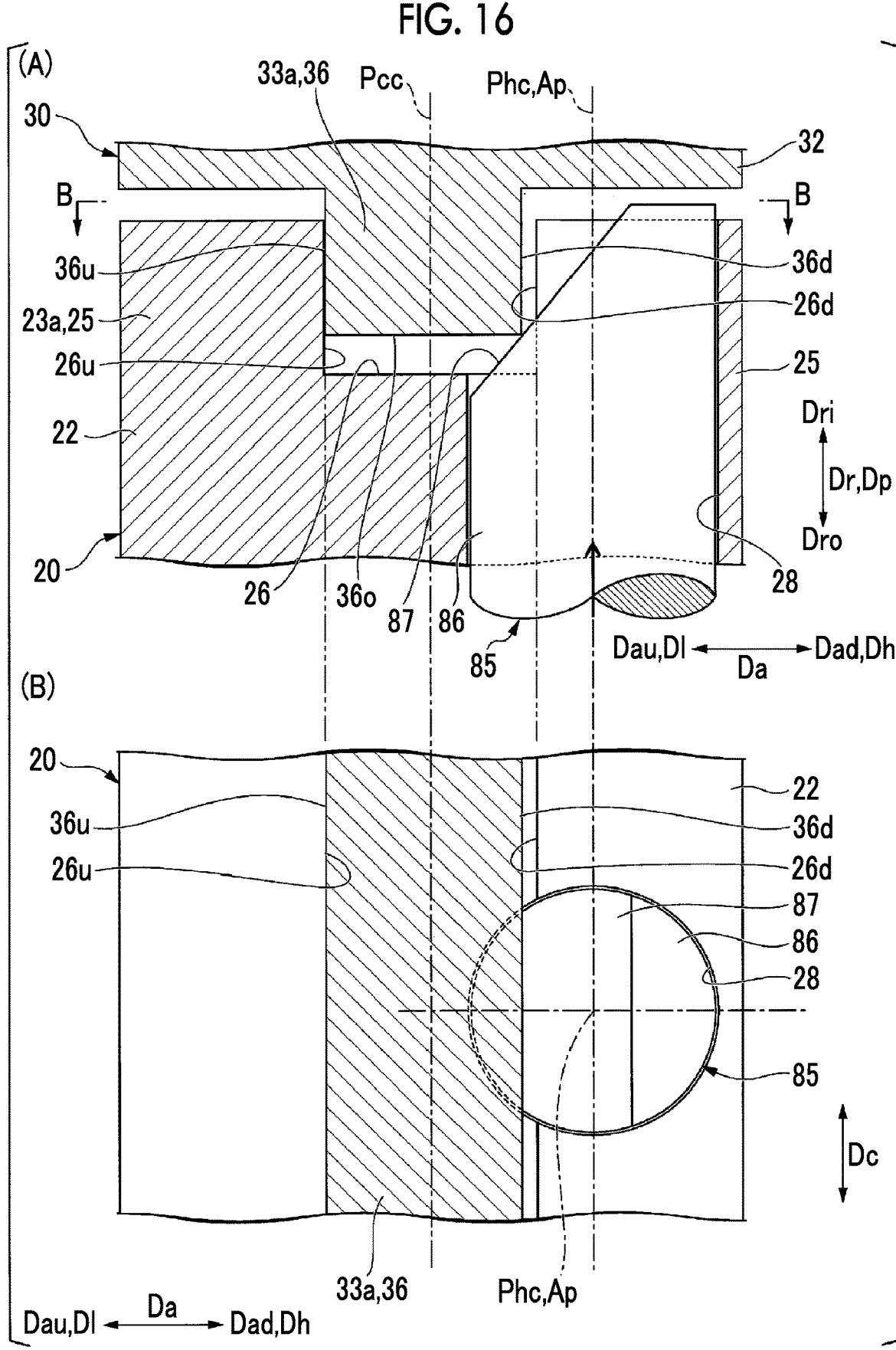
FIG. 16 illustrates an operating state reproducing structure when an operating state is reproduced according to a fourth embodiment of the present invention.

A fourth embodiment of the axial-flow fluid machine will be described with reference to FIG. 16.

The present embodiment is a modification example according to the second embodiment. In the operating state reproducing structure according to the second embodiment, the pin that is inserted into the through-hole 28 is the eccentric pin 80. On the other hand, in the operating state reproducing structure according to the present embodiment, the pin that is inserted into the through-hole 28 is the tapered pin 85. The operating state reproducing structure according to the present embodiment is the same as the operating state reproducing structure according to the second embodiment, except that the eccentric pin 80 of the operating state reproducing structure according to the second embodiment is replaced with the tapered pin 85.

The tapered pin 85 is the same as the tapered pin 85 according to the third embodiment.

In the pin operating step according to the present embodiment, as in the third embodiment, the first end portion of the tapered pin 85 is directed to the radially inner side Dri, and the tapered surface 87 is directed to the axially upstream side Dau (low-pressure side Dal). In this manner, the tapered pin 85 is pushed into the through-hole 28. That is, the tapered pin 85 is relatively moved with respect to the inner peripheral surface of the through-hole 28. During a process of pushing the tapered pin 85 into the through-hole 28, the tapered surface 87 of the tapered pin 85 comes into contact with the projecting portion 36 of the retainer ring 30. Specifically, in the projecting portion 36, the tapered surface 87 comes into contact with a corner between a radially outer side surface 36o facing the radially outer side Dro and the downstream end surface 36d. Even after the tapered surface 87 comes into contact with the corner, if the tapered pin 85 is pushed into the through-hole 28, a position in contact with the corner on the tapered surface 87 moves to the axially upstream side Dau. Therefore, since the tapered pin 85 is pushed into the through-hole 28, the retainer ring 30 having the projecting portion 36 is pushed to the axially upstream side Dau (low-pressure side Dal) by the tapered pin 85. The upstream end surface 36u of the projecting portion 36 comes into contact with the upstream groove side surface 26u of the groove 26. That is, the positional relationship in the axial direction Da between the retainer ring 30 and the compressor casing 20 is the same as that of the compressor 10 in the operating state by performing the operating state reproducing step including the pin operating step.

Accordingly, in the present embodiment, the tip clearance can also be measured in a state close to the operating state of the compressor 10 by performing the operating state reproducing step.

In the present embodiment and the third embodiment, a shape of the through-hole 28 into which the tapered pin 85 is inserted is a columnar shape. However, the shape of the through-hole 28 may be a prismatic shape. That is, a cross-sectional shape of the through-hole 28 is not limited to a circular shape. In this case, it is preferable that the cross-sectional shape of the tapered pin 85 matches the cross-sectional shape of the through-hole 28.

Modification Example

The above-described embodiments are examples of measuring the tip clearance of the compressor 10 of the gas turbine 1. However, as in the compressor 10 of the gas turbine 1 described above, as long as the axial-flow fluid machine has the rotor, the stator blade row, the retainer ring, and the casing, and the engaging portions in which the retainer ring and the casing respectively engage with each other, the operating state reproducing structure according to the present invention is applicable to the axial-flow fluid machine, and the tip clearance measuring method described above can be performed.

For example, the turbine 50 of the gas turbine 1 described above is also the axial-flow fluid machine. Moreover, as in the compressor 10 described with reference to FIG. 2, the turbine 50 also has a rotor 51, a stator blade row 58, a casing 60, and a retainer ring 70, and has engaging portions 63 and 73 in which the casing 60 and the retainer ring 70 respectively engage with each other. Accordingly, the turbine 50 may adopt the operating state reproducing structure described in each of the above-described embodiments. The operating state reproducing structure of the turbine 50 may be used. In a state where the operating state reproducing structure is reproduced, the tip clearance of the turbine 50 may be measured. However, in the compressor 10, the axially downstream side Dad is the high-pressure side Dah, and the axially upstream side Dau is the low-pressure side Dal. In contrast, in the turbine 50, the axially downstream side Dad is the low-pressure side Dal, and the axially upstream side Dau is the high-pressure side Dah. Therefore, in a case where the turbine 50 adopts any one of the operating state reproducing structures described above, the operating state reproducing structure may be a symmetrical structure in the axial direction Da with reference to the penetration center position Phc of the operating state reproducing structure of the compressor 10.

Figure 17:
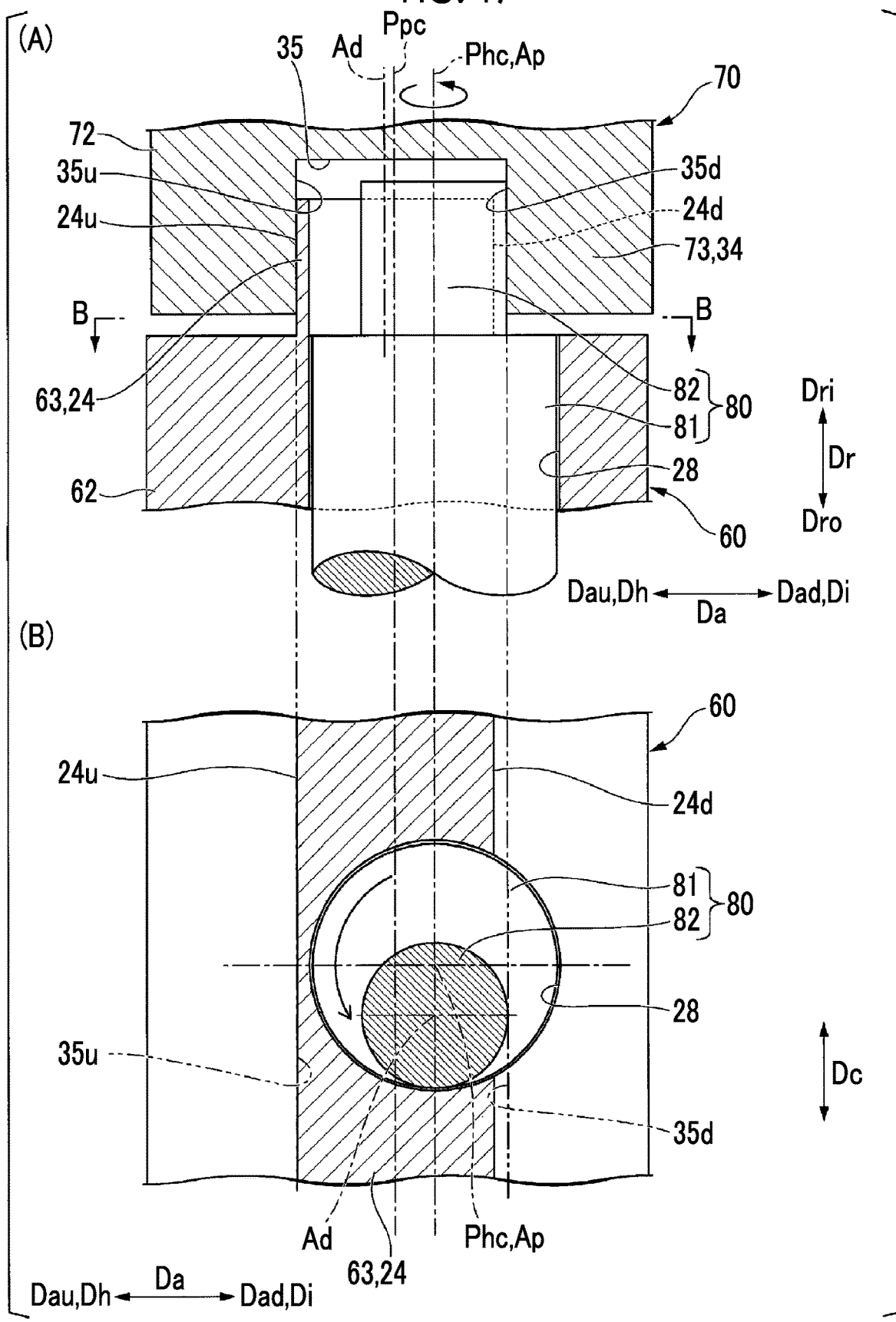
FIG. 17 illustrates an operating state reproducing structure according to a modification example in the first embodiment of the present invention.

Specifically, for example, in a case where the turbine 50 adopts the operating state reproducing structure in the compressor 10 according to the first embodiment, as illustrated in FIG. 17, the penetration center position Phc which is the position of the central axis of the through-hole 28 is located at the position biased to the axially downstream side Dad (low-pressure side Dal) inside the region where the engaging portion 63 is formed in the turbine casing 60 in the axial direction Da. Here, the position biased to the axially downstream side Dad is the position of the axially downstream side Dad from the center position Ppc in the axial direction Da of the engaging portion 63 of the turbine casing 60. The center position Ppc in the axial direction Da of the engaging portion 63 of the turbine casing 60 is the center position in the axial direction Da of the projecting portion 24 belonging to the engaging portion 63, that is, the projecting width center position. Accordingly, the penetration center position Phc is a position on the axially downstream side Dad (low-pressure side Dal) from the projecting width center position Ppc inside a region where the engaging portion 63 is formed in the turbine casing 60.

The projecting portion 24 extending in the circumferential direction Dc is partially cut out due to the through-hole 28. Specifically, on the downstream end surface 24d of the projecting portion 24, a portion including the penetration center position Phc is cut out in the circumferential direction Dc. The downstream end surface 24d of the projecting portion 24 is located at a position on the axially downstream side Dad (low-pressure side Dl) from the penetration center position Phc in the axial direction Da. On the other hand, the upstream end surface 24u of the projecting portion 24 is present throughout the entire area in the circumferential direction Dc. The upstream end surface 24u of the projecting portion 24 is located at a position on the axially upstream side Dau (high-pressure side Dh) from the penetration center position Phc in the axial direction Da.

As described above, in a case where the turbine 50 adopts the operating state reproducing structure in the compressor 10 according to the first embodiment, the operating state reproducing structure of the turbine 50 is the structure where the operating state reproducing structure is symmetric in the axial direction Da with reference to the penetration center position Phc of the operating state reproducing structure according to the first embodiment. In other words, in the drawing where the structure illustrated in FIG. 6 is symmetric in the axial direction Da with reference to the penetration center position Phc in FIG. 6 illustrating the operating state reproducing structure according to the first embodiment coincides with FIG. 17 illustrating the operating state reproducing structure of the turbine 50.

In the turbine 50 in the operating state, the force oriented toward the axially downstream side Dad is applied to the retainer ring 70 that holds the stator blade 59. Therefore, in the turbine 50 in the operating state, the upstream groove side surface 35u of the groove 35 in the retainer ring 70 and the upstream end surface 24u of the projecting portion 24 in the turbine casing 60 come into contact with each other.

In an example illustrated in FIG. 17, if the eccentric pin 80 is rotated by performing the pin operating step, the eccentric portion 82 of the eccentric pin 80 moves to the axially downstream side Dad, and a portion of the eccentric portion 82 is located on the axially downstream side Dad (low-pressure side Dal) from the downstream end surface 24d of the projecting portion 24. Therefore, a portion of the eccentric portion 82 comes into contact with the downstream groove side surface 35d of the groove 35, and pushes the retainer ring 70 having the groove 35 to the axially downstream side Dad (low-pressure side Dal). As a result, the retainer ring 70 relatively moves to the axially downstream side Dad (low-pressure side Dal) with respect to the turbine casing 60, and the upstream end surface 24u of the projecting portion 24 comes into contact with the upstream groove side surface 35u of the groove 35. That is, the positional relationship in the axial direction Da between the retainer ring 70 and the turbine casing 60 is the same as that of the turbine 50 in the operating state by performing the operating state reproducing step including the pin operating step (S2b).

In addition, as in the turbine 50, in a case where the axial-flow fluid machine in which the axially downstream side is the low-pressure side Dal adopts the operating state reproducing structure in the compressor 10 according to the second embodiment, the operating state reproducing structure of the axial-flow fluid machine is the structure where the operating state reproducing structure is symmetric in the axial direction Da with reference to the penetration center position Phc of the operating state reproducing structure according to the second embodiment. In addition, in a case where the axial-flow fluid machine in which the axially downstream side is the low-pressure side Dal adopts the operating state reproducing structure in the compressor 10 according to the third embodiment, the operating state reproducing structure of the axial-flow fluid machine is the structure where the operating state reproducing structure is symmetric in the axial direction Da with reference to the penetration center position Phc of the operating state reproducing structure according to the third embodiment. In a case where the axial-flow fluid machine in which the axially downstream side is the low-pressure side Dal adopts the operating state reproducing structure in the compressor 10 according to the fourth embodiment, the operating state reproducing structure of the axial-flow fluid machine is the structure where the operating state reproducing structure is symmetric in the axial direction Da with reference to the penetration center position Phc of the operating state reproducing structure according to the fourth embodiment.

Figure 18:
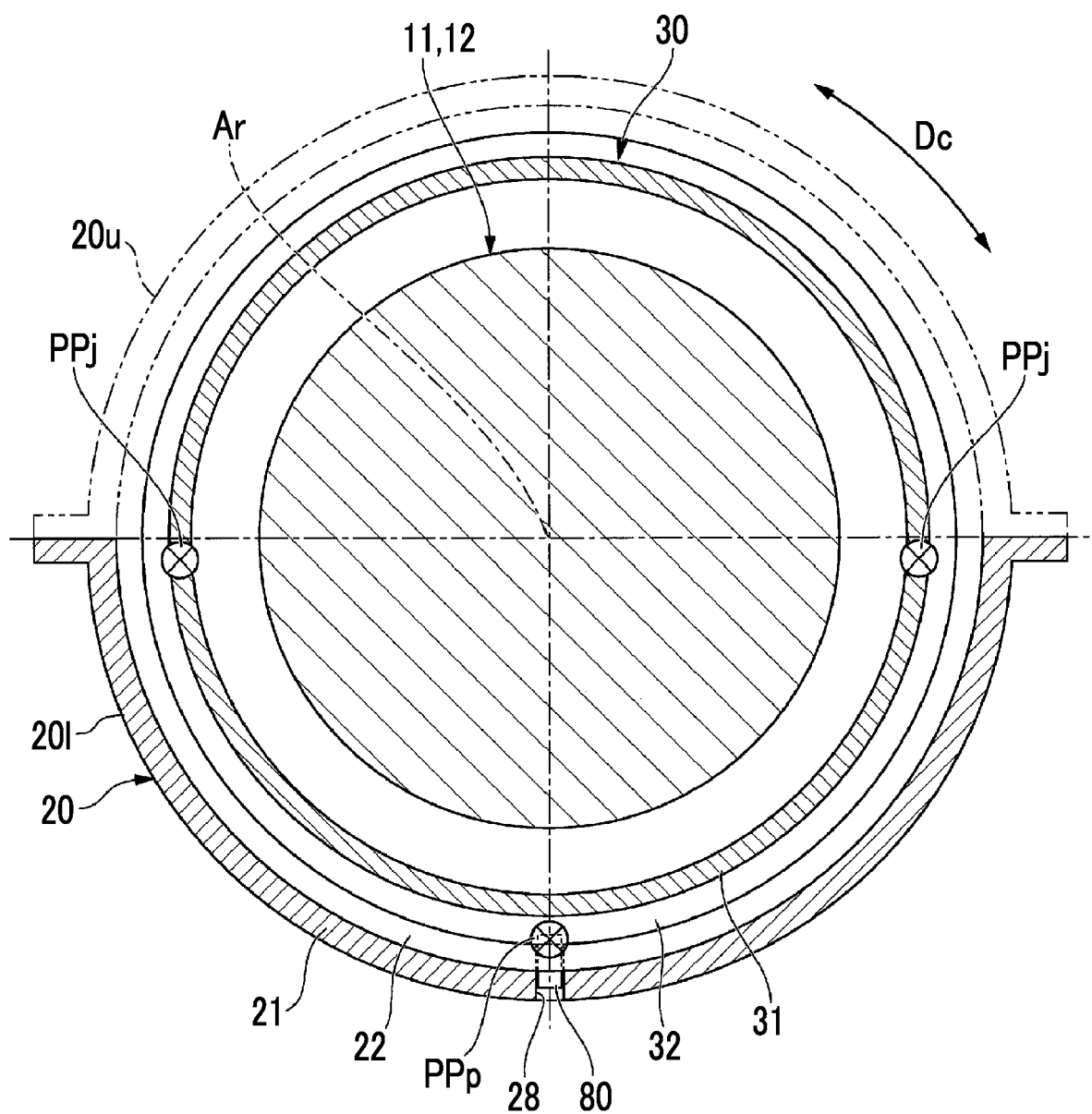
FIG. 18 is a view for describing a push position according to a first modification example in the first embodiment of the present invention.

In the above-described embodiments, as described with reference to FIG. 4, the number of the push positions PPj and PPp is four. Among these, the lower two push positions PPp excluding the upper two push positions PPj are the push positions of the eccentric pin 80. However, as illustrated in FIG. 18, the number of the push positions PPj and PPp may be three. The lower one push position excluding the upper two push positions PPj may be the push positions PPp of the eccentric pin 80. In addition, the number of the push positions PPj and PPp may be five. The lower three push positions excluding the upper two push positions PPj may be the push positions PPp of the eccentric pin 80.

Figure 19:
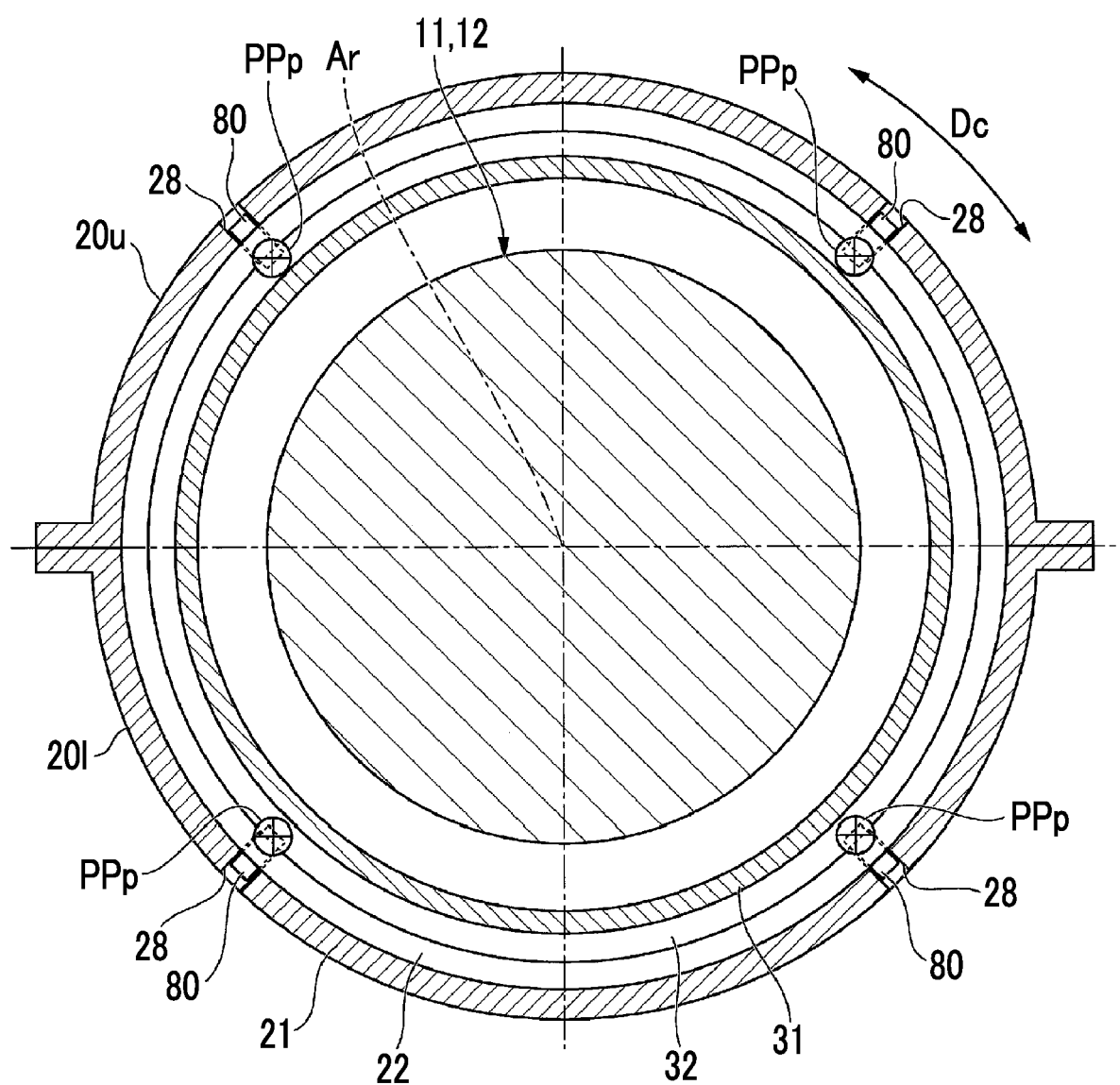
FIG. 19 is a view for describing a push position according to a second modification example in the first embodiment of the present invention.

In the above-described embodiments, the jack J is used in the operating state reproducing step. Accordingly, in a state where the upper half casing 20*u* is not attached to the lower half casing 20*l* of the compressor casing 20, the operating state reproducing step and the measuring step are performed. However, in a case where the operating state reproducing step is performed by using only the pin without using the jack J, in a state where the upper half casing 20*u* is attached to the lower half casing 20*l* of the compressor casing 20, the operating state reproducing step and the measuring step can be performed. In this case, for example, as illustrated in FIG. 19, two push positions PPp of the pin 80 are set above the rotor axis Ar, and two push positions PPp of the pin 80 are also set below the rotor axis Ar. The number of the push positions PPp set above the rotor axis Ar may be one. In addition, the number of the push positions PPp set below the rotor axis Ar may be three or more.

INDUSTRIAL APPLICABILITY

According to an aspect of the present invention, a tip clearance can be measured in a state close to an operating state.

REFERENCE SIGNS LIST

1: gas turbine
2: gas turbine rotor
5: gas turbine casing
10: compressor
11: compressor rotor
12: rotor shaft
13: rotor blade row
14: rotor blade
18: stator blade row
19: stator blade
20: compressor casing
20*u*: upper half casing
20*l*: lower half casing
20*fu*, 20*fl*: flange
21: casing main body
22: casing leg portion
22*c*: cutout portion
22*d*: inner end surface
22*da*: downstream end surface
23, 23*a*: engaging portion
24: projecting portion
24*t*: inner end surface
24*u*: upstream end surface
24*d*: downstream end surface
25: wall plate portion
26: groove
26*u*: upstream groove side surface
26*d*: downstream groove side surface
28, 28*a*: through-hole
30: retainer ring
30*l*: lower portion retainer ring
30*u*: upper portion retainer ring
31: ring main body
31*u*: upstream-side end surface (low-pressure side end surface)
31*d*: downstream-side end surface (high-pressure side end surface)
31*p*: gas pass surface
32: ring leg portion
33, 33*a*: engaging portion
34: wall plate portion
35: groove
35*u*: upstream groove side surface
35*d*: downstream groove side surface
36: projecting portion
36*u*: upstream end surface
36*d*: downstream end surface
39: air compression flow path
40: combustor
50: turbine
51: turbine rotor
52: rotor shaft
53: rotor blade row
54: rotor blade
54*b*: blade body
54*p*: platform
58: stator blade row
59: stator blade
59*b*: blade body
59*o*: outer shroud
59*i*: inner shroud
60: turbine casing
61: casing main body
62: casing leg portion
63: engaging portion
70: retainer ring
71: ring main body
72: ring leg portion
73: engaging portion
76: split ring
76*p*: gas pass surface
78: heat insulating ring
79: combustion gas flow path
80, 80*a*: eccentric pin
81, 81*a*: pin main body
82, 82*a*: eccentric portion
83: wrench hole
85: tapered pin 86: pin main body
87: tapered surface
89: lid
C: tip clearance
J: jack
Su: upstream-side space
Sd: downstream-side space
p1: first point
p2: second point
Ar: rotor axis
Phc: penetration center position
Ppc: center position of engaging portion (projecting width center position)
Pcc: center position of engaging portion (groove width center position)
Ap: pin central axis
Ad: eccentric axis
PPj: push position of jack
PPp: push position of pin
Da: axial direction
Dau: axially upstream side
Dad: axially downstream side
Dc: circumferential direction
Dr: radial direction
Dri: radially inner side
Dro: radially outer side
Dh: high-pressure side
Dl: low-pressure side
Dp: pin extending direction
Dp1: first side
Dp2: second side

The invention claimed is:

1. An axial-flow fluid machine comprising:
a rotor having a plurality of rotor blades disposed at an interval in a circumferential direction with respect to a rotor axis, and rotating around the rotor axis;
a stator blade row having a plurality of stator blades disposed at an interval in the circumferential direction at a position shifted from the plurality of rotor blades in an axial direction in which the rotor axis extends;
a cylindrical retainer ring that holds the stator blade row from a radially outer side with respect to the rotor axis; and
a cylindrical casing that supports the retainer ring from the radially outer side,
wherein the retainer ring and the casing have engaging portions which engage with each other,
wherein the engaging portion of one member out of the retainer ring and the casing has a projecting portion projecting to the other member side in a radial direction with respect to the rotor axis and extending in the circumferential direction,
wherein the engaging portion of the other member has a pair of wall plate portions projecting to the one member side in the radial direction, extending in the circumferential direction, facing each other in the axial direction, and forming a groove therebetween so that the projecting portion enters the groove,
wherein in the casing, a through-hole penetrating in the radial direction around a penetration center position biased to one side in the axial direction is formed inside a region where the engaging portion is formed in the casing in the axial direction,
wherein in the engaging portion of the casing, the other side portion in the axial direction with reference to the through-hole is present in an entire area in the circumferential direction, and
wherein a portion at the penetration center position in the circumferential direction on the one side in the axial direction with reference to the penetration center position does not have the engaging portion of the casing due to the through-hole.

2. The axial-flow fluid machine according to claim 1,
wherein the engaging portion of the casing has the projecting portion,
wherein the engaging portion of the retainer ring has the pair of wall plate portions,
wherein out of sides facing each other in the axial direction, a high-pressure side serving as a side on which a fluid flowing in the axial direction has higher pressure due to rotation of the rotor is the other side, and a low-pressure side opposite to the high-pressure side is the one side,
wherein the penetration center position is a position biased to the low-pressure side in the axial direction inside the region where the engaging portion is formed in the casing in the axial direction, and
wherein in the projecting portion of the casing, a portion on the high-pressure side in the axial direction with reference to the through-hole is present in the entire area in the circumferential direction.

3. The axial-flow fluid machine according to claim 1,
wherein the engaging portion of the casing has the pair of wall plate portions,
wherein the engaging portion of the retainer ring has the projecting portion,
wherein out of sides facing each other in the axial direction, a high-pressure side serving as a side on which a fluid flowing in the axial direction has higher pressure due to rotation of the rotor is the one side, and a low-pressure side opposite to the high-pressure side is the other side,
wherein the penetration center position is a position biased to the high-pressure side in the axial direction inside the region where the engaging portion is formed in the casing in the axial direction, and
wherein out of the pair of wall plate portions of the casing, the wall plate portion on the low-pressure side in the axial direction with reference to the through-hole is present in the entire area in the circumferential direction.

4. The axial-flow fluid machine according to claim 1, wherein the casing has a plurality of the through-holes formed at an interval in the circumferential direction.

5. The axial-flow fluid machine according to claim 1, further comprising:
a pin that is inserted into the through-hole,
wherein the through-hole is a columnar hole formed around the penetration center position,
wherein the pin has a columnar pin main body capable of being inserted into the through-hole and having an outer peripheral surface coming into contact with an inner peripheral surface of the through-hole, and an eccentric portion formed in an end of the pin main body in a pin extending direction in which a pin central axis of the pin main body extends, and
wherein the eccentric portion has a columnar shape formed around an eccentric axis parallel to the pin central axis and separated from the pin central axis, and an outer diameter of the eccentric portion is smaller than an outer diameter of the pin main body.

6. The axial-flow fluid machine according to claim 1, further comprising:
a pin that is inserted into the through-hole, wherein the pin has a tapered surface inclined with respect to a pin extending direction in which the pin extends, which is formed in an end portion of the pin in the pin extending direction.

7. The axial-flow fluid machine according to claim 6, further comprising:
a lid that closes the through-hole from the radially outer side.

8. The axial-flow fluid machine according to claim 7, wherein a length of the pin in the pin extending direction is a length that causes the pin to interfere with the lid when the pin is pushed into the through-hole and the lid closes the through-hole.

9. The axial-flow fluid machine according to claim 1, wherein the casing is a compressor casing into which gas flows from an axially upstream side which is a first side in the axial direction, and which discharges the gas from an axially downstream side opposite to the axially upstream side, and
wherein the rotor is a compressor rotor that rotates around the rotor axis so as to compress the gas as the gas flows toward the axially downstream side.

10. The axial-flow fluid machine according to claim 1, wherein the casing is a turbine casing into which gas flows from an axially upstream side which is a first side in the axial direction, and which exhausts the gas from an axially downstream side opposite to the axially upstream side, and
wherein the rotor is a turbine rotor to which a rotational force is applied by the gas flowing inside the turbine casing from the axially upstream side to the axially downstream side.

11. A tip clearance measuring method of measuring a tip clearance between a rotor blade and a stationary member present on a radially outer side of the rotor blade in an axial-flow fluid machine including
a rotor having a plurality of the rotor blades disposed at an interval in a circumferential direction with respect to a rotor axis, and rotating around the rotor axis,
a stator blade row having a plurality of stator blades disposed at an interval in the circumferential direction at a position shifted from the plurality of rotor blades in an axial direction in which the rotor axis extends,
a cylindrical retainer ring that holds the stator blade row from the radially outer side with respect to the rotor axis, and
a cylindrical casing that supports the retainer ring from the radially outer side, in which the retainer ring and the casing have engaging portions which engage with each other, in which the engaging portion of one member out of the retainer ring and the casing has a projecting portion projecting to the other member side in a radial direction with respect to the rotor axis and extending in the circumferential direction, and in which the engaging portion of the other member has a pair of wall plate portions projecting to the one member side in the radial direction, extending in the circumferential direction, facing each other in the axial direction, and forming a groove therebetween so that the projecting portion enters the groove, the method comprising:
an operating state reproducing step of pushing the retainer ring from a plurality of push positions different from each other in the circumferential direction, to a low-pressure side opposite to a high-pressure side on which a fluid flowing in the axial direction has higher pressure due to rotation of the rotor, out of sides facing each other in the axial direction; and
a measuring step of measuring the tip clearance between the rotor blade and the stationary member while the operating state reproducing step is performed.

12. The tip clearance measuring method according to claim 11,
wherein the casing has a through-hole penetrating in the radial direction,
wherein the axial-flow fluid machine includes a pin that is inserted into the through-hole, and
wherein the operating state reproducing step includes a pin operating step of causing the pin to push the retainer ring to the low-pressure side at one push position out of the plurality of push positions by inserting the pin into the through-hole of the casing and relatively displacing the pin with respect to an inner peripheral surface of the through-hole.

13. A tip clearance measuring method for the axial-flow fluid machine according to claim 1,
wherein the axial-flow fluid machine includes a pin that is inserted into the through-hole, and
wherein the tip clearance measuring method comprises
an operating state reproducing step of pushing the retainer ring from a plurality of push positions different from each other in the circumferential direction, to a low-pressure side opposite to a high-pressure side on which a fluid flowing in the axial direction has higher pressure due to rotation of the rotor, out of sides facing each other in the axial direction, and
a measuring step of measuring a tip clearance between the rotor blade and a stationary member present on a radially outer side of the rotor blade while the operating state reproducing step is performed,
wherein the operating state reproducing step includes a pin operating step of causing the pin to push the retainer ring to the low-pressure side at one push position out of the plurality of push positions by inserting the pin into the through-hole of the casing and relatively displacing the pin with respect to an inner peripheral surface of the through-hole.

14. The tip clearance measuring method according to claim 12,
wherein the casing has the same number of the through-holes as the number of the plurality of push positions, which are formed at an interval in the circumferential direction,
wherein the axial-flow fluid machine has the same number of the pins as the number of the plurality of push positions, and
wherein in the operating state reproducing step, the pin operating step is performed by using the pins at each push position of all of the push positions.

15. The tip clearance measuring method according to claim 12,
wherein the pin has a columnar pin main body capable of being inserted into the through-hole and having an outer peripheral surface coming into contact with an inner peripheral surface of the through-hole, and an eccentric portion formed in an end of the pin main body in a pin extending direction in which a pin central axis of the pin main body extends,
wherein the eccentric portion has a columnar shape formed around an eccentric axis parallel to the pin central axis and separated from the pin central axis, and an outer diameter of the eccentric portion is smaller than an outer diameter of the pin main body, and
wherein in the pin operating step, the pin is inserted into the through-hole by directing the eccentric portion of the pin toward a radially inner side with respect to the rotor axis, and the pin is rotated around the pin central axis inside the through-hole.

16. The tip clearance measuring method according to claim 12,
wherein the pin has a tapered surface inclined with respect to a pin extending direction in which the pin extends, which is formed in an end portion of the pin in the pin extending direction, and
wherein in the pin operating step, the pin is pushed into the through-hole by directing an end portion on a side having the tapered surface of the pin toward a radially inner side with respect to the rotor axis, and directing the tapered surface toward the low-pressure side.

17. The tip clearance measuring method according to claim 12,
wherein the retainer ring has a high-pressure side end surface facing the high-pressure side, and a low-pressure side end surface facing the low-pressure side, and
wherein the operating state reproducing step includes a jack operating step of bringing an operating end of a jack into contact with the push position excluding the push position pushed in the pin operating step out of the plurality of push positions in the circumferential direction on the high-pressure side end surface and causing the jack to push the retainer ring to the low-pressure side by operating the jack.

\* \* \* \* \*